United States Patent
Baum et al.

(10) Patent No.: US 6,850,495 B1
(45) Date of Patent: Feb. 1, 2005

(54) METHODS, APPARATUS AND DATA STRUCTURES FOR SEGMENTING CUSTOMERS USING AT LEAST A PORTION OF A LAYER 2 ADDRESS HEADER OR BITS IN THE PLACE OF A LAYER 2 ADDRESS HEADER

(75) Inventors: Robert T. Baum, Gaithersburg, MD (US); Eric A. Voit, Bethesda, MD (US)

(73) Assignee: Verizon Communications Inc., New York, NY (US)

( * ) Notice: Subject to any disclaimer, the term of this patent is extended or adjusted under 35 U.S.C. 154(b) by 0 days.

(21) Appl. No.: 09/652,750

(22) Filed: Aug. 31, 2000

(51) Int. Cl.[7] .............................................. H04L 12/28
(52) U.S. Cl. ...................... 370/256; 370/402; 370/465; 709/249
(58) Field of Search ................................ 370/401, 409, 370/410, 389, 392, 474, 468, 412, 399, 349, 395.43, 352, 395.52; 713/166, 200, 201, 202, 154, 153; 714/4

(56) References Cited

U.S. PATENT DOCUMENTS

| | | | |
|---|---|---|---|
| 5,088,090 A | * 2/1992 | Yacoby | 370/402 |
| 5,566,170 A | * 10/1996 | Bakke et al. | 370/392 |
| 5,610,905 A | * 3/1997 | Murthy et al. | 370/401 |
| 5,740,375 A | * 4/1998 | Dunne et al. | 370/389 |
| 5,774,640 A | * 6/1998 | Kurio | 714/4 |
| 5,805,801 A | * 9/1998 | Holloway et al. | 713/201 |
| 5,920,566 A | * 7/1999 | Hendel et al. | 370/389 |
| 5,946,313 A | * 8/1999 | Allan et al. | 370/401 |
| 5,959,989 A | * 9/1999 | Gleeson et al. | 370/401 |
| 5,991,300 A | * 11/1999 | Tappan | 370/392 |
| 6,035,405 A | * 3/2000 | Gage et al. | 713/201 |
| 6,058,429 A | * 5/2000 | Ames et al. | 370/399 |
| 6,097,720 A | * 8/2000 | Araujo et al. | 370/410 |
| 6,104,700 A | * 8/2000 | Haddock et al. | 370/412 |
| 6,243,379 B1 | * 6/2001 | Veerina et al. | 370/389 |
| 6,314,106 B1 | * 11/2001 | King et al. | 370/412 |
| 6,539,011 B1 | * 3/2003 | Keenan et al. | 370/352 |
| 6,546,001 B1 | * 4/2003 | Semper et al. | 370/349 |
| 6,618,381 B1 | * 9/2003 | Miyamoto et al. | 370/395.43 |
| 6,633,571 B1 | * 10/2003 | Sakamoto et al. | 370/401 |
| 6,636,516 B1 | * 10/2003 | Yamano | 370/395.52 |
| 2003/0067912 A1 | * 4/2003 | Mead et al. | 370/389 |

* cited by examiner

*Primary Examiner*—Duc Ho
*Assistant Examiner*—Phuongchau Ba Nguyen
(74) *Attorney, Agent, or Firm*—Leonard C. Suchtya, Esq.; Joel Wall, Esq.; Straub & Pokotylo

(57) ABSTRACT

Limiting or controlling access to various services thereby performing a firewall function. An access router may permit or deny a packet based on at least a portion of a unique bit string (or context information) which replaced layer 2 header information (e.g., the layer 2 (e.g., MAC) address). Further, a particular quality of service may be indicated by at least a part of the unique bit string (or context information). The service provided to a group of customers, that group of customers being defined by at least a portion of the unique bit string (or context information), may be monitored. Multicast groups may be supported by checking at least a part of the unique bit string (or context information) to determine whether or not a customer associated with that port is permitted to join the multicast group.

30 Claims, 31 Drawing Sheets

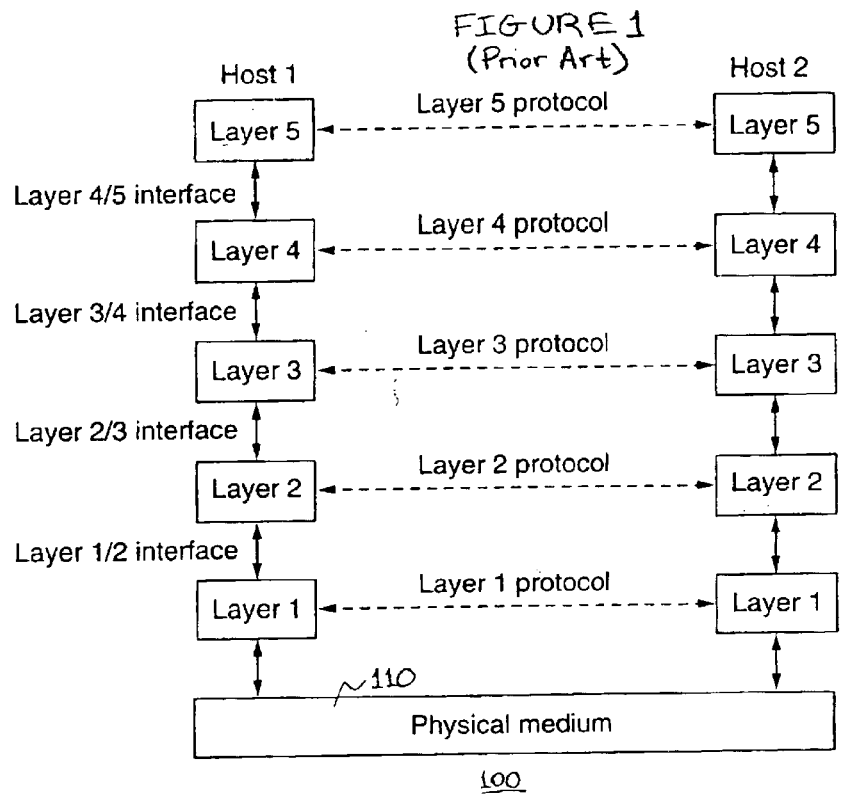
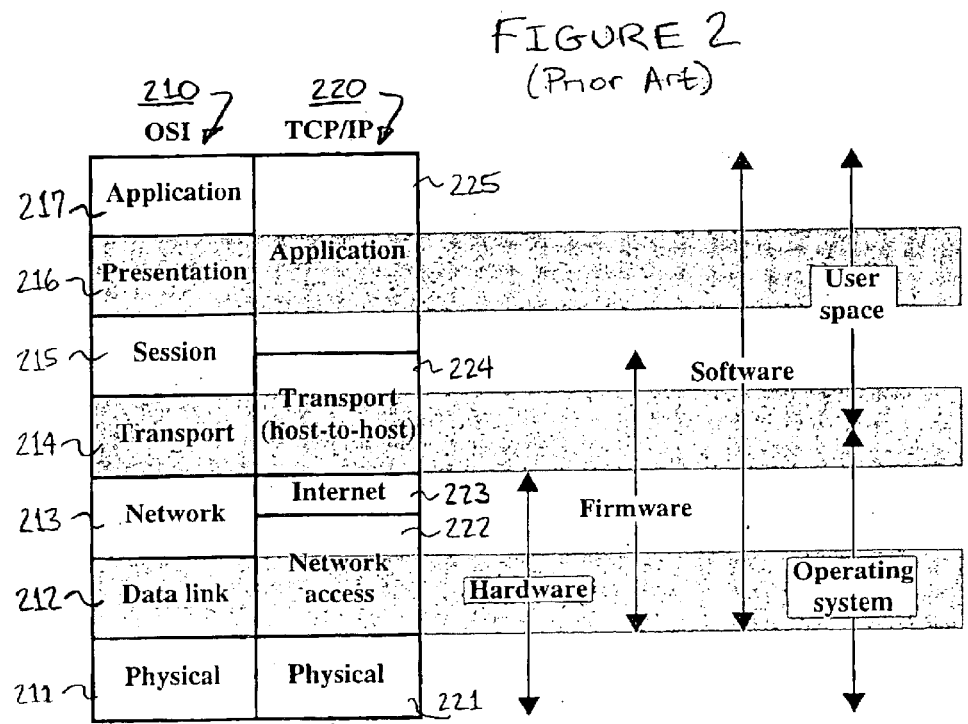

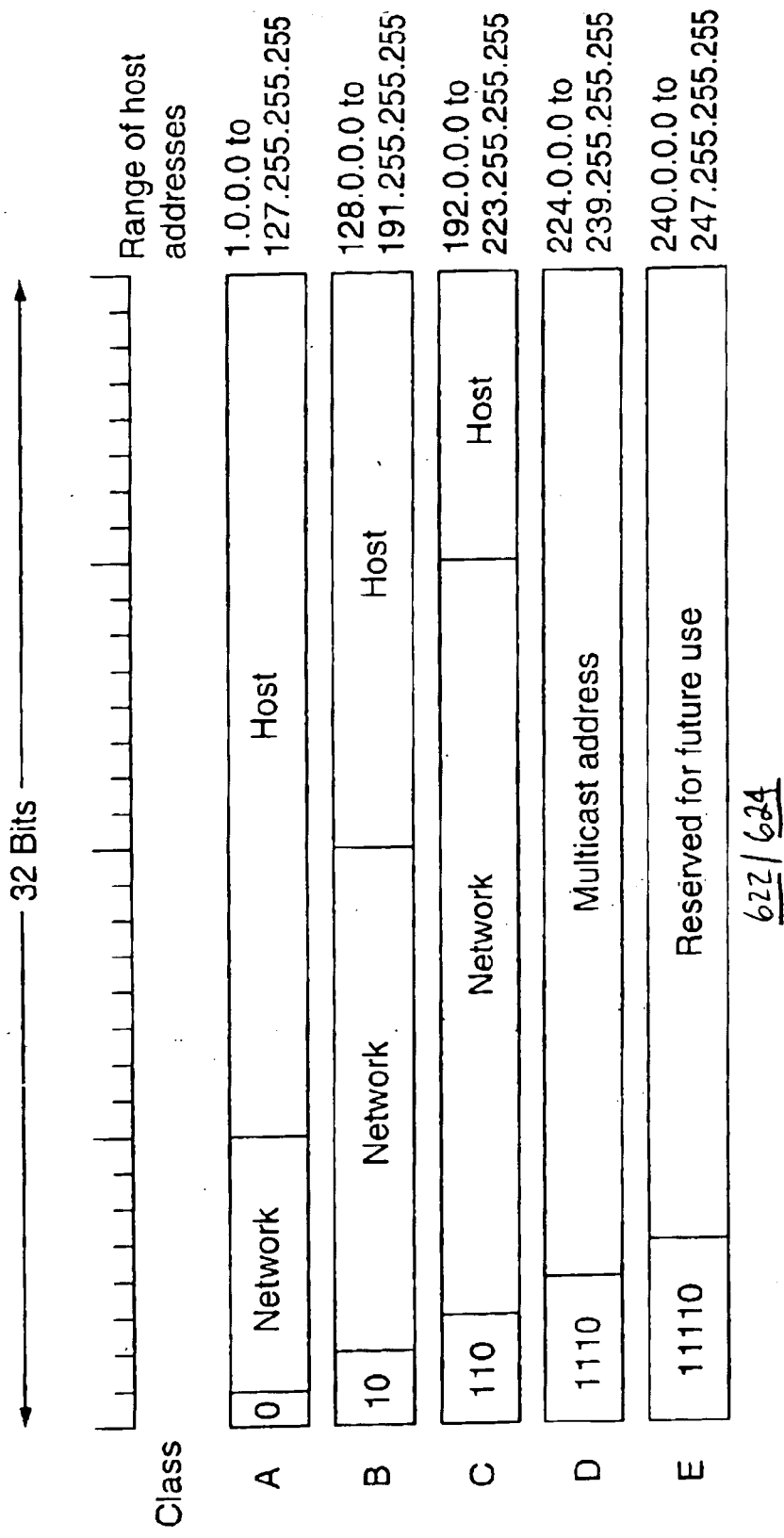

402

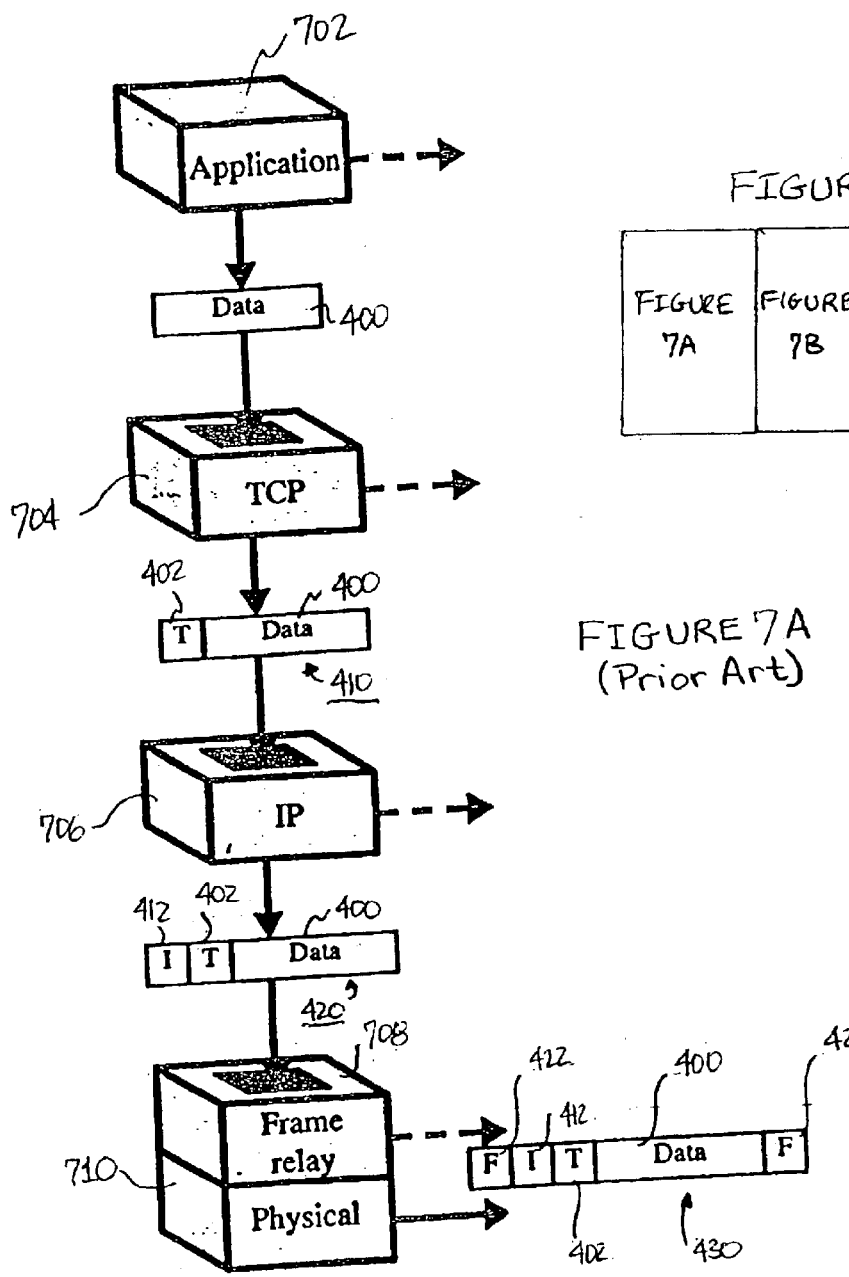
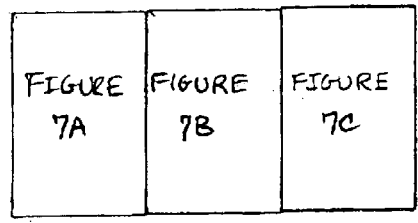
FIGURE 7A
(Prior Art)

Layer 2/3 Access Control

| Context | L3 Source Address | L3 Destination Address | Action |
|---|---|---|---|
| BA Services | | | |
| Service Package #1 | ANY | Service Address #11 | DENY |
| Service Package #2 | ANY | Service Address #12 | DENY |
| Service Package #3 | ANY | Service Address #13 | DENY |
| VRPN - No Internet Access | | | |
| Context A | 100.100.100.0/24 | 100.100.101.0/24 | PERMIT |
| Context A | 100.100.100.0/24 | 200.200.201.0/24 | PERMIT |
| Context A | 100.100.100.0/24 | 205.205.205.0/24 | PERMIT |
| Context A | ANY | ANY | DENY |
| VRPN - With Internet Access | | | |
| Context B | 150.000.100.0/24 | 150.100.200.0/24 | PERMIT |
| Context B | 150.000.100.0/24 | 150.100.210.0/24 | PERMIT |
| Context B | 150.000.100.0/24 | 150.100.220.0/24 | PERMIT |
| VPRN Internet Access | | | |
| Context B | 900.900.900.0/24 | ANY | PERMIT |
| Internet Access | | | |
| Context C | BA Address Space | ANY | PERMIT |
| Default Deny | | | |
| ANY | ANY | ANY | DENY |

FIGURE 29
1060'

| LOGICAL PORT | VPN-OUI | VPN-INDEX | CUSTOMER-ID | SERVICE LEVEL | MULTICAST ACL GROUP | QoS PROFILE | VPI | VCI | PVC | ETHERNET PORT |
|---|---|---|---|---|---|---|---|---|---|---|
| ... | ... | ... | ... | ... | ... | ... | ... | ... | ... | ... |

| LOGICAL PORT | AGG MAC ADDRESS | IP ADDRESS | SUBNET MASK | CLIENT MAC ADDRESS |
|---|---|---|---|---|
| ... | ... | ... | ... | ... |

| MULTICAST ACL GROUP | MULTICAST ADDRESS | SUBNET MASK | VPN-OUI | VPN-INDEX |
|---|---|---|---|---|
| ... | ... | ... | ... | ... |

3110, 3120, 3130, 3140, 3150

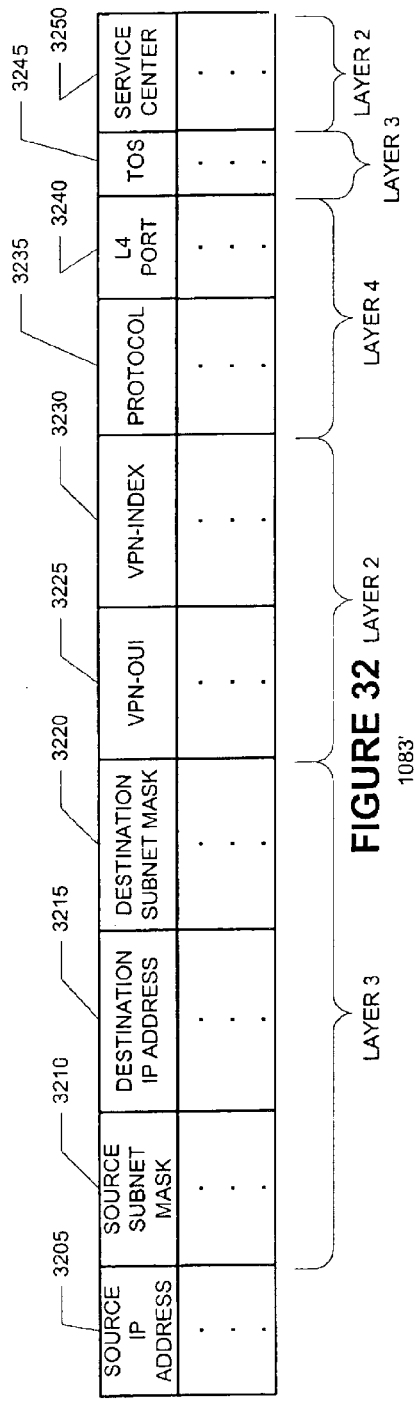
FIGURE 32 1083'
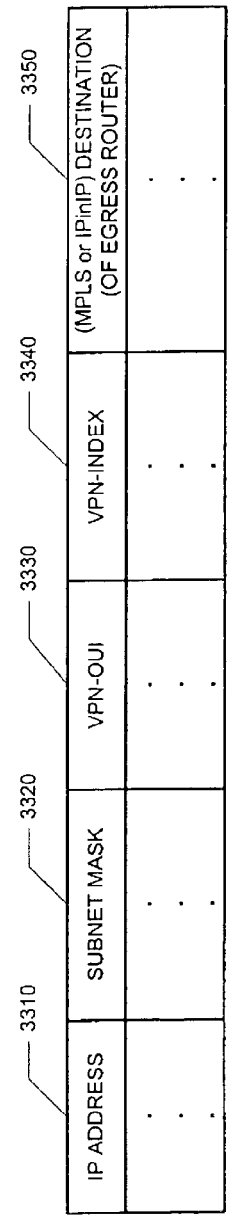
FIGURE 33 1085'
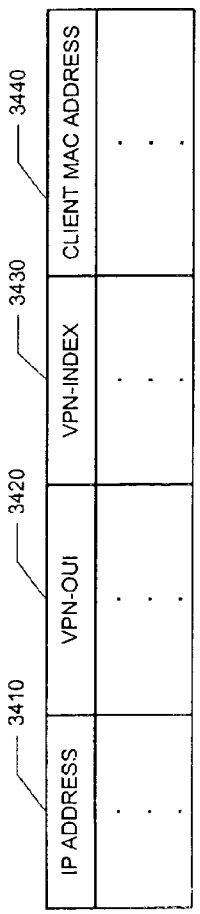
FIGURE 34 1089'

METHODS, APPARATUS AND DATA STRUCTURES FOR SEGMENTING CUSTOMERS USING AT LEAST A PORTION OF A LAYER 2 ADDRESS HEADER OR BITS IN THE PLACE OF A LAYER 2 ADDRESS HEADER

§ 1. BACKGROUND OF THE INVENTION

§ 1.1 Field of the Invention

The present invention concerns methods, apparatus and data structures for aggregating traffic, which may originate from various media transport types, for presentation to a router, such as an access router of a network. Further, the traffic aggregation performed by the present invention may be done such that customers can be identified and such that customer device addressing information is available. Moreover, the traffic aggregation performed by the present invention may be done such that the service provided to a group of customers may be monitored; multicast groups are secure; and the access router can control access to services, facilitate virtual private networks, and facilitate the provision of different quality of service and/or class of service levels.

§ 1.2 Related Art

The description of art in this section is not, and should not be interpreted to be, an admission that such art is prior art to the present invention.

§ 1.2.1 Communications Protocol Stack

Although networking software and network reference models are known to those skilled in the art, they are introduce here for the reader's convenience.

To reduce their complexity, networks may be organized as a series of layers, each one built upon the one below it as shown in FIG. 1. Each layer functions to offer certain services to the higher layer, thereby shielding those higher layers from the details of how the offered services are actually implemented. The entities comprising the corresponding layers on different machines are called "peers". Such peers use rules and conventions, also referred to as the layer n protocol, to communicate with each other as depicted by the dashed lines in FIG. 1. Actually, no data are directly transferred from layer n on one machine to layer n on another machine. Rather, in the machine transmitting the data, each layer passes data and control information to the layer immediately below it, until the lowest layer (layer 1) is reached. Below layer 1, is a physical medium 110 through which actual communications take place. At the machine receiving the data, each layer passes data and control information to the layer immediately above it until the highest layer is reached. Thus, referring to FIG. 1, actual communications take place via the solid lines and the physical medium 110, while virtual peer-to-peer communications occur via the dashed lines.

Still referring to FIG. 1, interfaces are arranged between adjacent layers. Each of these interfaces defines primitive operations and services that the lower layer offers to the upper layer.

The set of layers and protocols may be referred to as a "network architecture". A list of protocols used by a system, one protocol per layer, may be referred to as a "protocol stack" or "protocol suite".

§ 1.2.2 Network Architecture Reference Models

FIG. 2 illustrates a comparison of the Open Systems Interconnection (or "OSI") reference model 210 for network architectures and the transfer control protocol/Internet protocol (or "TCP/IP") reference model 220 for network architectures. Although those skilled in the art will be familiar with both reference models, each is introduced below for the reader's convenience.

§ 1.2.2.1 The OSI Reference Model

As shown in FIG. 2, the OSI reference model 210 has seven (7) distinct layers; namely, (i) a physical layer 211, (ii) a data link layer 212, (iii) a network layer 213, (iv) a transport layer 214, (v) a session layer 215, (vi) a presentation layer 216, and (vii) an application layer 217. Each layer is briefly introduced below.

The physical layer 211 deals with transmitting raw bits over a communications channel. Thus, the physical layer is typically concerned with mechanical, electrical, optical, and procedural interfaces, as well as the physical transmission medium (e.g., twisted copper pair, co-axial cable, optical fiber, etc.) that lies below the physical layer.

The data link layer 212 functions to transform a raw communications facility into a line that appears free from undetected transmission errors to the network layer 213. The data link layer 212 does this by having the sending host segment its data into "data frames", transmitting these frames to the receiving host, and processing "acknowledgement frames" sent back from the receiver.

The network layer 213 functions to control the operation of a subnetwork between the hosts and controls the routing of packets between the hosts.

The transport layer 214 functions to accept data from the session layer 215 and segment this data into smaller units, if necessary, for use by the network layer 213. The transport layer 214 also determines a type of service (e.g., error-free, point-to-point) to provide to the session layer 215. Further, the transport layer 214 controls the flow of data between hosts. The transport layer 214 is a true "end-to-end" layer, from source host to destination host, since a program on the source machine converses with a similar program on the destination machine, using message headers and control messages.

The session layer 215 functions to allow different machines to establish sessions between them. The session layer 215 may manage dialog control and maintain synchronization.

The presentation layer 215 concerns the syntax and semantics of information transmitted.

The application layer 216 may function to define network virtual terminals that editors and other programs can use, and to transfer files.

§ 1.2.2.2 The TCP/IP Model

In recent decades, and in the past five (5) to ten (10) years in particular, computers have become interconnected by networks by an ever increasing extent; initially, via local area networks (or "LANs"), and more recently via LANS, wide area networks (or WANs) and the Internet. In 1969, the Advanced Research Projects Agency (ARPA) of the U.S. Department of Defense (DoD) deployed ARPANET as a way to explore packet-switching technology and protocols that could be used for cooperative, distributed, computing. Early on, ARPANET was used by the TELNET application that permitted a single terminal to work with different types of computers, and by the file transfer protocol (or "FTP") which permitted different types of computers to transfer files from one another. In the early 1970s', electronic mail became the most popular application which used ARPANET.

This packet switching technology was so successful, that the ARPA applied it to tactical radio communications (Packet Radio) and to satellite communications (SATNET). However, since these networks operated in very different communications environments, certain parameters, such as maximum packet size for example, were different in each case. Thus, methods and protocols were developed for "internetworking" these different packet switched networks. This work lead to the transmission control protocol (or "TCP") and the internet protocol (or "IP") which became the TCP/IP protocol suite. Although the TCP/IP protocol suite, which is the foundation of the Internet, is known to those skilled in the art, it is briefly described below for the reader's convenience.

As shown in FIG. 2, the TCP/IP reference model 220 includes a physical layer 221, a network access layer 222, an internet layer 223, a transport layer 224, and an application layer 225. Each of these layers is briefly introduced below.

The physical layer 221 defines the interface between a data transmission device (e.g., a computer) and a transmission medium (e.g., twisted pair copper wires, co-axial cable, optical fiber, etc.). It specifies the characteristics of the transmission medium, the nature of the signals, the data rate, etc.

The network access layer 222 defines the interface between an end system and the network to which it is attached. It concerns access to, and routing data across, a network. Frame relay is an example of a network access layer.

The internet layer 223 functions to permit hosts to inject packets into any network and have them travel independently to the destination machine (which may be on a different network). Since these packets may travel independently, they may event arrive in an order other than the order in which they were sent. Higher layers can be used to reorder the packets. Thus, the main function of the internet layer 320 is to deliver (e.g., route) IP packets to their destination.

The transport layer 224 is an end-to-end protocol. For example, the transmission control protocol (or "TCP") is a reliable connection-oriented protocol that allows a byte stream originating on one machine to be delivered, without error, on any other machine on the Internet. More specifically, the TCP protocol fragments an incoming data stream into discrete messages, each of which is passed to the internet layer 223. At the destination, the TCP protocol reassembles the received messages into an output stream.

The TCP/IP model 220 does not have session and presentation layers. Instead, an application layer 225 contains all of the higher-level protocols that are used to support various types of end use applications (e.g., the simple mail transfer protocol (or "SMTP") for e-mail, the file transfer protocol (or "FTP"), etc.).

The TCP/IP model does not define what occurs below the internet layer 223, other than to note that the host has to connect to the network using some protocol so that it can send IP packets over it. This protocol varies from host to host and network to network.

Basically, each of the layers encapsulates, or converts, data in a higher layer. For example, referring to FIG. 4, user data 400 as a byte stream is provided with a TCP header 402 to form a TCP segment 410. The TCP segment 410 is provided with an IP header 412 to form an IP datagram 420. The IP datagram 420 is provided with a network header 422 to define a network-level packet 430. The network-level packet 430 is then converted to radio, electrical, optical (or other) signals sent over the transmission medium at a specified rate with a specified type of modulation.

The TCP header 402, as illustrated in FIG. 5, includes at least twenty (20) octets (i.e., 160 bits). Fields 502 and 504 identify ports at the source and destination systems, respectively, that are using the connection. Values in the sequence number 506, acknowledgement number 508 and window 516 files are used to provide flow and error control. The value in the checksum field 518 is used to detect errors in the TCP segment 410.

FIGS. 6A and 6B illustrate two (2) alternative IP headers 412 and 412', respectively. Basically, FIG. 6A depicts the IP protocol (Version 4) that has been used. FIG. 6B depicts a next generation IP protocol (Version 6) that, among other things, provides for more source and destination addresses.

More specifically, referring to FIG. 6A, the four (4) bit version field 602 indicates the version number of the IP, in this case, version 4. The 4-bit Internet header length field 604 identifies the length of the header 412 in 32-bit words. The 8-bit type of service field 606 indicates the service level that the IP datagram 420 should be given. The 16-bit total length field 608 identifies the total length of the IP datagram 420 in octets. The 16-bit identification field 610 is used to help reassemble fragmented user data carried in multiple packets. The 3-bit flags field 612 is used to control fragmentation. The 13-bit fragment offset field 614 is used to reassemble a datagram 420 that has become fragmented. The 8-bit time to live field 616 defines a maximum time that the datagram is allowed to exist within the network it travels over. The 8-bit protocol field 618 defines the higher-level protocol to which the data portion of the datagram 420 belongs. The 16-bit header checksum field 620 permits the integrity of the IP header 412 to be checked. The 32-bit source address field 322 contains the IP address of the sender of the IP datagram 420 and the 32-bit destination address field contains the IP address of the host to which the IP datagram 120 is being sent. Options and padding 626 may be used to describe special packet processing and/or to ensure that the header 412 is a complete multiple of 32-bit words.

Referring to FIG. 6B, the four (4) bit version field 602 indicates the version number of the IP, in this case, version 6. The 4-bit priority field 628 enables a sender to prioritize packets sent by it. The 24-bit flow label field 630 is used by a source to label packets for which special handling is requested. The 16-bit payload length field 632 identifies the size of data carried in the packet. The 8-bit next header field 634 is used to indicate whether another header is present and if so, to identify it. The 8-bit hop limit field 636 serves to discard the IP datagram 420 if a hop limit (e.g., the number of times the packet is routed) is exceeded. Also provided are 128-bit source and destination address fields 322' and 324', respectively.

Having described the TCP/IP protocol stack 220, the routing of a TCP/IP packet is now described.

A TCP/IP packet is communicated over the Internet (or any internet or intranet) via routers. Basically, routers in the Internet use destination address information (Recall fields 624 and 624'.) to forward packets towards their destination. Routers interconnect different networks. More specifically, routers accept incoming packets from various connected networks, use a look-up table to determine a network upon which the packet should be placed, and routes the packet to the determined network.

FIG. 7, which includes FIGS. 7A through 7C, illustrates the communication of data from a sender, to a receiver, using the TCP/IP protocol stack. Referring first to FIG. 7A, an application protocol 702 prepares a block of data (e.g., an e-mail message (SMTP), a file (FTP), user input (TELNET), etc.) 400 for transmission. Before the data 400 are sent, the sending and receiving applications agree on a format and encoding and agree to exchange data (Recall, e.g., the peer-to-peer communications depicted with dashed lines in FIG. 1.). If necessary, the data are converted (character code, compression, encryption, etc.) to a form expected by the destination device.

The TCP layer 704 may segment the data block 400, keeping track of the sequence of segments. Each TCP segment 410 includes a header 402 containing a sequence number (recall field 506) and a frame check sequence to detect errors. A copy of each TCP segment is made so that if a segment is lost or damaged, it can be retransmitted. When an acknowledgement of safe receipt is received from the receiver, the copy of the segment is erased.

The IP layer 706 may break the TCP segment into a number of datagrams 420 to meet size requirements of networks over which the data will be communicated. Each datagram includes the IP header 412.

A network layer 708, such as frame relay for example, may apply a header and trailer 422 to frame the datagram 420. The header may include a connection identifier and the trailer may contain a frame check sequence for example. Each frame 430 is then transmitted, by the physical layer 710, over the transmission medium as a sequence of bits.

FIG. 7B illustrates the operation of the TCP/IP protocol stack at a router in the network. The physical layer 712 receives the incoming signal 430 from the transmission medium and interprets it as a frame of bits. The network (e.g., frame relay) layer 714 then removes the header and trailer 422 and processes them. A frame check sequence may be used for error detection. A connection number may be used to identify the source. The network layer 714 then passes the IP datagram 420 to the IP layer 718.

The IP layer examines the IP header 412 and makes a routing decision (Recall the destination address 324, 324'). A local line control (or "LLC") layer 720 uses a simple network management protocol (or "SNMP") and adds a header 750 that contains a sequence number and address information. Another network layer 722 (e.g., media access control (or "MAC")) adds a header and trailer 760. The header may contain address information and the trailer may contain a frame check sequence. The physical layer 724 then transmits the frame 450 over another transmission medium.

FIG. 7C illustrates the operation of the TCP/IP protocol stack at a receiver. The physical layer 732 receives the signals from the transmission medium and interprets them as a frame of bits. The network layer 734 removes the header and trailer 760 and processes them. For example, the frame check sequence in the trailer may be used for error detection. The resulting packet 440 is passed to the transport layer 736, which processes the header 750 for flow and error control. The resulting IP datagram 420 is passed to the IP layer 738, which removes the header 412. Frame check sequence and other control information may be processed at this point.

The TCP segment 410 is then passed to the TCP layer 740, which removes the header 402 and may check the frame check sequence. (In the event of a match, the match is acknowledged and in the event of a mismatch, the packet is discarded.) The TCP layer 740 then passes the data 400 to the application layer 742. If the user data was segmented (or fragmented), the TCP layer 740 reassembles it. Finally, the application layer 742 performs any necessary transformations, such as decompression and decryption for example, and directs the data to an appropriate area of the receiver, for use by the receiving application.

§ 1.3 Expected Drivers of Future Network Design

The present inventors believe that most of the world's networks are, or will be, based on the Internet Protocol (or "IP"). There are at least three (3) assumptions underlying this belief. First, IP separates applications (or services) from transport (e.g., data link technology). The present inventors believe that value added services will be IP-based, due in part to favorable price-performance curves of IP access technology and the way in which IP can inter-operate with other technologies. Second, IP quality of service (or "QoS") is emerging. These QoS mechanisms can be applied to the specific applications and services (e.g., audio-visual multicast, conferencing, high speed access such as via DSL, IP derived lines, IP telephony, IP fax, IP Centrex, Internet service provider (or "ISP") services such as e-mail, Internet access, authorization, authentication and accounting, and billing, and unified messaging) of individual customers. Various types of applications may demand various levels of quality of service. For example, a voice over Internet application may require low delays, but may tolerate some packets being dropped, to the extent that such dropped packets cannot be perceived or are not annoying to users. This is because it would be pointless to retransmit erroneous packets in such a real-time application. Data transport may tolerate delays but will not tolerate transmission errors. Video over the Internet will require high bandwidth but may tolerate some dropped packets (again, to the extent that such dropped packets would not be perceived by, or be annoying to, a customer). Third, data competitive (or certified) local exchange carriers (or "DLECs")—that is, companies that provide high speed access to the Internet—currently provide integrated IP services using asynchronous transfer mode (or "ATM") transport. The present inventors believe that as lower cost link layer technologies are deployed, such as gigabit Ethernet for example, DLECs will abandon ATM.

With this background in mind, the present inventors propose a multi-service local access and transport area (or "LATA") IP network with the following two (2) design goals in mind. First, it should be simple for existing and potential customers to use the proposed LATA IP network. Second, the LATA IP network should be robust and flexible, while having a low operating cost. The present inventors believe that customer simplicity can be achieved by (i) eliminating or minimizing changes to existing layer 1 and 2 customer interfaces (so that existing customers may be retained) and (ii) providing new, low cost, high value IP interfaces to customers (such as Fast Ethernet and Gigabit Ethernet). The present inventors further believe that the LATA IP network can be robust, flexible, and have low operating costs by (i) minimizing complexity (by isolating subsystems with different component technologies and separating application functionality from the underlying transport network), (ii) minimizing operations, (iii) providing the ability to route traffic for services which have different topology and volume assumptions, and (iv) ensuring reliability by using off-the-shelf components and standard protocols (thereby eliminating customization) and by providing redundant equipment and facilities.

The LATA IP network envisioned by the present inventors may use off-the-shelf routers. These routers may function to (i) provide access to customers, (ii) interconnect networks, and/or (iii) provide routing between intranetwork elements. Thus, the LATA IP network may use three (3) different types of routers. In the LATA IP network, access routers may be distributed towards the edge of the network and may provide individual customer IP interfaces into the network. Thus, the access router may act as a universal IP edge device for diverse customer access methods. Interconnection routers may be centralized with the IP LATA and may provide a small number of (e.g., high bandwidth) external interfaces to the other carrier's (or enterprise customer's) network(s). Finally, routers may be deployed, as needed, throughout the IP LATA to consolidate traffic and to minimize the cost of traffic transport between elements of the IP LATA.

§ 1.3.1 Challenges In Accessing An Edge Router

One aspect of the present invention concerns the challenge of aggregating a number of physical connections from a number of potentially diverse customers, for connection to an edge router. For example, standards-based routers that can handle 128 Gbps bandwidth are currently available. However, such routers cannot accommodate the physical connections of the tens or hundreds of thousands of individual services that they could otherwise accommodate. For example, assuming that customers had a very high end 10 or 100 Mbps service (or communications access links capable of such service levels), such routers could process the data flow from 12,800 or 1,280 customers, respectively, but could not accommodate those numbers of physical connections. Naturally, a larger number of physical connections (e.g., for lower end service(s)) could not be accommodated.

Digital subscriber line access multiplexers (or "DSLAMs") may be used to concentrate traffic in asynchronous digital subscriber line (or "ADSL") implementations by using time division multiplexing. Basically, a DSLAM can accept twisted copper pairs supporting ADSL service and provide them on virtual channels on a shared common communications medium, such as an OC3 (e.g., 155.52 Mbps) fiber channel. However, an asynchronous transfer mode (or "ATM") switch is needed to switch these physical connections to virtual channels, thereby necessitating an ATM switch port for each customer connection. Aside from physically requiring a lot of space, using a DSLAM for this purpose would be expensive on a per port basis. Thus, improved techniques are needed to aggregate physical connections, for example, for presentation to an access router.

Another aspect of the present invention concerns the challenge of separating customer services from customer access technologies (e.g., DSL, Frame Relay, Gigabyte Ethernet). In this way, a variety of services could be provided to a variety of potential customers without regard for the way in which such potential customers access the IP LATA network.

§ 2. SUMMARY OF THE INVENTION

The present invention may provide an aggregation unit to aggregate physical connections from customers for presentation to an access router and to de-aggregate traffic from a shared link(s) from the access router. These functions may be accomplished by configuring logical ports of the aggregation unit such that each has a unique layer 2 (e.g., MAC) address or some other unique bit string (also referred to as "context information") associated with it. Such context information may replace, at least to some extent, layer 2 (e.g., address) header information on packets accepted by the logical port. In one embodiment, the context information may include customer-specific information, information locating the logical port within the network, and/or class of service information. This context information, which depends solely on the logical port, can be extended to include quality of service information. Such quality of service information may convey network requirements inherent in the application with which an inbound packet(s) is associated, and may be derived from layer 3 and layer 4 information in the inbound packet(s). Thus context information may include a packet-independent part associated with a logical port and a packet-dependant part determined from an inbound packet(s). The term "bit string" or "context information" is not intended to be limited to contiguous bits, and is to include non-contiguous bits as can be appreciated from FIG. 36.

If it can be assumed that IP addresses are globally unique, the layer 2 (e.g., MAC) address of the customer device connected with the port can be associated with, and therefore determined from, the IP address of the attached device. Otherwise (or in addition), the layer 2 (e.g., MAC) address of the customer device connected with the port can be determined using some type of address resolution technique (e.g., resolving the address with a protocol, such as ARP for example, typically by broadcasting a request for an address), and/or snooping (e.g., examining the layer 2 source address of an inbound (ingress) packet). Thus, for example, if the IP addresses are dynamically assigned to customer devices, then the aggregation unit may periodically poll (e.g., via an address resolution protocol or "ARP" broadcast) the attached device(s) for its layer 2 (e.g., MAC) address, and/or may examine the layer 2 source address of inbound packets.

When a packet is received from a customer, layer 2 header information (e.g., the source and destination layer 2 (e.g., MAC) addresses) may be removed and a unique bit string (or "context information"), a part of which is associated with a logical port or interface (which is associated with a physical port), and a part of which is based on layer 3 and/or 4 information in the packet, may be added. Preferably, these operations will not alter the "footprint" of the packet. To reiterate, these bits that replace layer 2 header information (e.g., the source and destination layer 2 (e.g., MAC) addresses), may be referred to as "context information". Again, context information may include a packet-independent part associated with a logical port and a packet-dependant part determined from an inbound packet(s). Traffic received at the logical ports is then aggregated onto a high bandwidth physical link(s) to the access router.

When a packet is received from the access router, the aggregation unit forwards it to the logical port associated with at least some bits of the bit string (i.e., of the context information) that reside in the place of the layer 2 (address) header. The destination layer 2 (e.g., MAC) address (or the other bits in the place of the layer 2 address) is then replaced with the layer 2 (e.g., MAC) address of the customer device associated with the port. To reiterate, the layer 2 (e.g., MAC) address of the customer device may be derived from the layer 3 destination address (if it can be assumed that layer 3 addresses are globally unique), or, alternatively may have been determined using an address resolution technique, and/or snooping.

The present invention may also support multicast groups by checking at least a part of the unique bit string (i.e., context information) which had been inserted in the layer 2 header space to determine whether or not the customer associated with that port is permitted to join the multicast group. The present invention may monitor the service provided to a group of customers, that group of customers being defined by at least a portion of the unique bit string (i.e., context information) which had been inserted in the layer 2 header space.

The present invention may also function serve to limit or control access to various services thereby performing a firewall function. In this regard, an access router may permit or deny a packet based on at least a portion of the unique bit string (i.e., context information) which had been inserted in the layer 2 header space. The present invention may further function to facilitate the provision of different quality of service levels. A particular quality of service may be indicated by at least a part of the unique bit string (i.e., context information) which had been inserted in the layer 2 header space.

The present invention may also function to enable virtual private networks since it preserves layer 2 header information or a unique bit string (or context information) which had been inserted in the layer 2 header space.

§ 3. BRIEF DESCRIPTION OF THE DRAWING

FIG. 1 illustrates the way in which network communications schemes may be described by a stack of protocols.

FIG. 2 compares the OSI reference model and the TCP/IP protocol suite.

FIG. 3 illustrates internet protocol (or "IP") global addressing.

FIGS. 7A through 7C illustrate the transmission of data over a network in accordance with the TCP/IP protocol suite.

FIG. 25 illustrates an exemplary data structure of access control information that may be used by an exemplary access router.

FIG. 29 illustrates an exemplary table that may be used by an exemplary aggregation device, to configure logical ports.

FIG. 30 illustrates an exemplary table that may be used by an exemplary aggregation device, to convert a port layer 2 address (or information in the place of the layer 2 address) to a customer device layer 2 address.

FIG. 31 illustrates an exemplary table that may be used by an exemplary aggregation device, to associate multicast networks or subnetworks with a virtual private network.

FIG. 32 illustrates an exemplary table that may be used by an exemplary access router, to control access to a network or to a network location.

FIG. 33 illustrates an exemplary table, which may be used by an exemplary access router, to encapsulate a packet so that layer 2 address information (or information in the place of the layer 2 address header) may be preserved.

FIG. 34 illustrates an exemplary table, which may be used by an exemplary access router, to determine a layer 2 (e.g., MAC) address of a customer device based on a layer 3 address and/or bits in the place of information (e.g., address information) in a layer 2 header.

Figure 35:
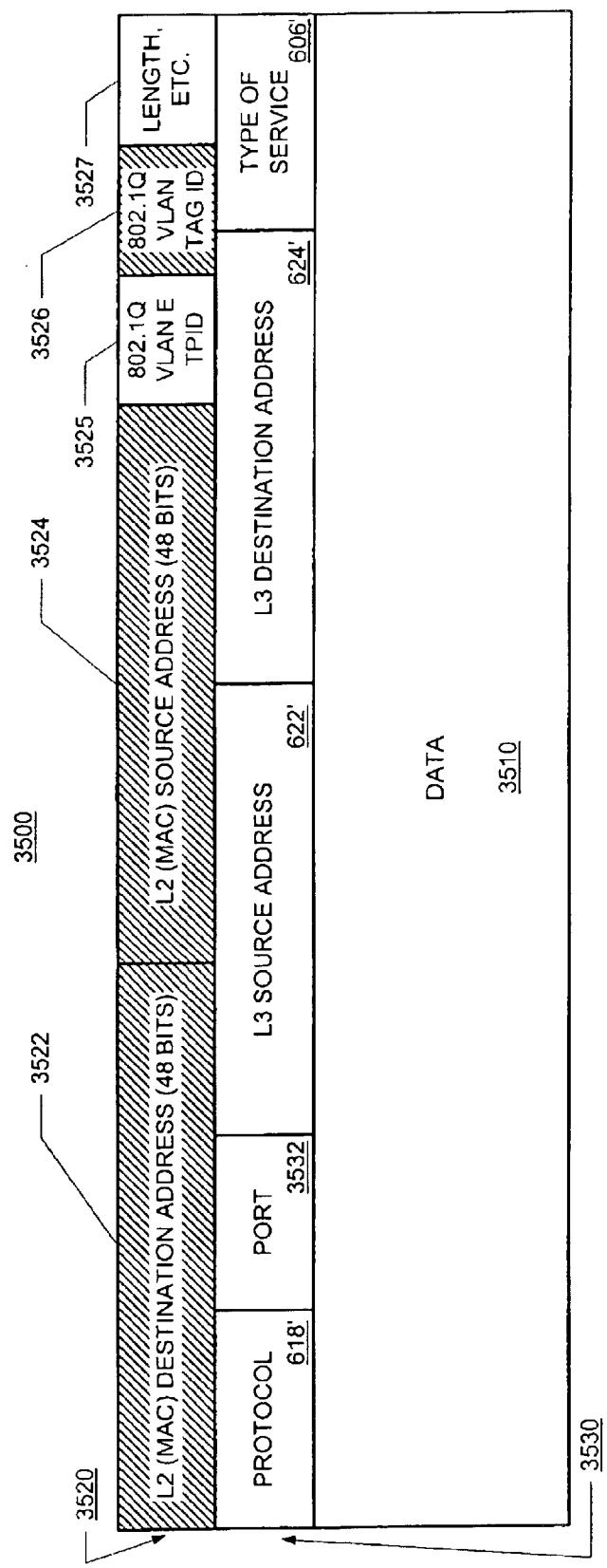

FIG. 35 illustrates an exemplary packet which may be sent by a customer and received by an aggregation unit.

Figure 36:
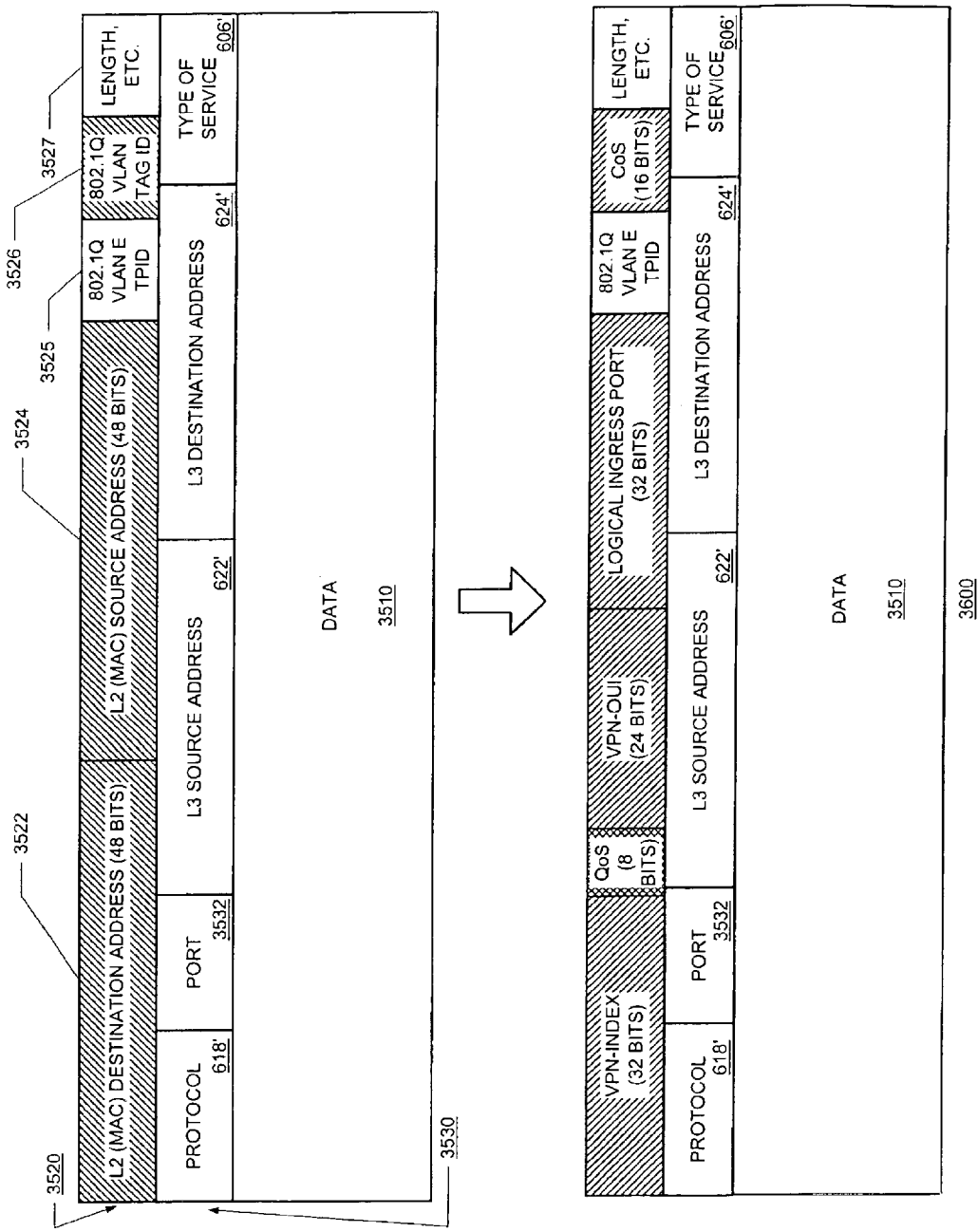

FIG. 36 illustrates the modification, by an exemplary aggregation unit, of a packet sent from a customer and bound for a network.

Figure 37:
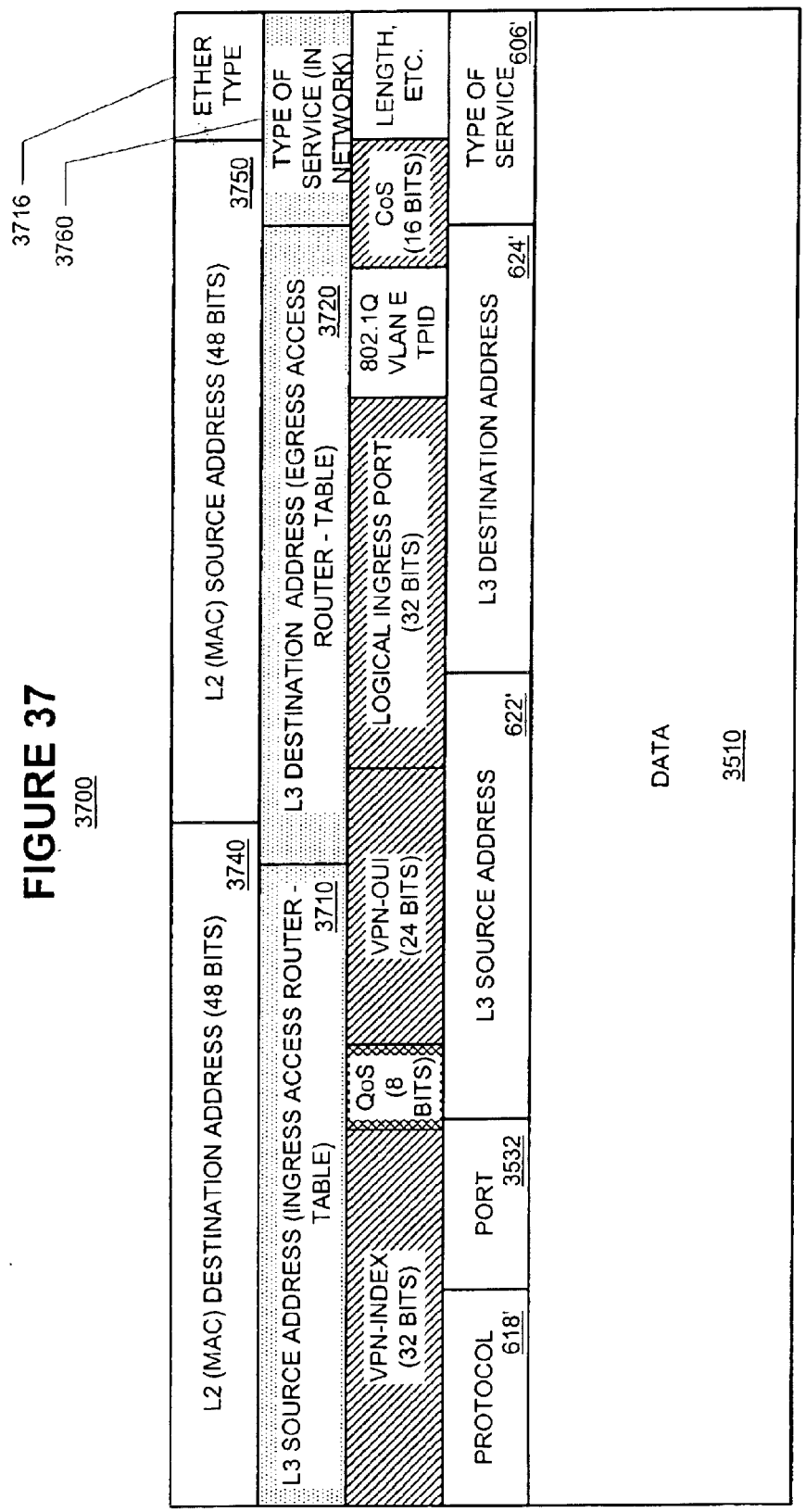

FIG. 37 illustrates the modification, by an exemplary access router, of a packet sent from a customer, as forwarded by an aggregation unit, and bound for a network.

§ 4. DETAILED DESCRIPTION

The present invention involves novel methods, apparatus and data structures for permitting customers to access a network, such as an IP network, and to help provide certain services. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown and the inventors regard their invention as the following disclosed methods, apparatus and data structures and any other patentable subject matter.

In the following, an exemplary environment in which the invention may operate is described in § 4.1. Then, functions that may be performed by the present invention are introduced in § 4.2. Thereafter, processes, structures, methods and data structures that may be used to effect those functions are described in § 4.3. Thereafter, the end-to-end processing of a packet in a system including exemplary aggregation units and access routers is described in § 4.4. Finally, some conclusions regarding various aspects of the present invention are provided in § 4.5.

§ 4.1 Environment in which Invention May Operate

Figure 8:
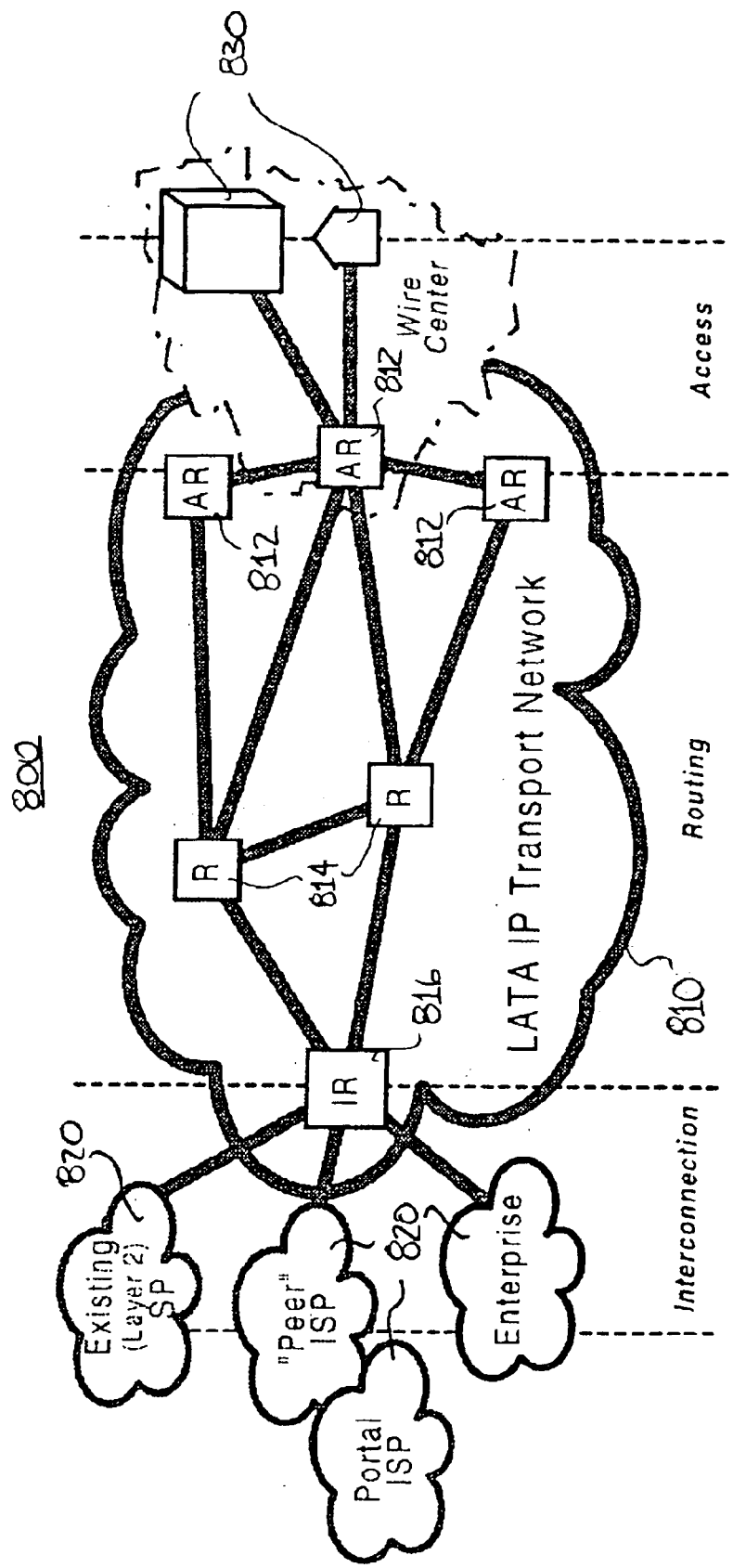
FIG. 8 is a high level diagram of a network that the present invention may be used to access.

FIG. 8 is a high level diagram of an environment 800 in which the present invention may operate. This environment 800 may include a LATA IP network 810, additional networks 820 such as an enterprise network, a portal Internet service provider (or "ISP") network, a peer ISP network, and an existing layer 2 service provider network. The networks 820 may be interconnected with the LATA IP network 810 via interconnection router(s) 816. Customers 830, such as homes and businesses, may be connected with the LATA IP network 810 via "access routers" 812. Finally, routers 814 may be provided within the LATA IP network 810 for consolidating traffic and minimizing traffic transport for example. One aspect of the present invention concerns aggregating physical connections from the customers 830 for presentation to an access router 812.

Figure 9:
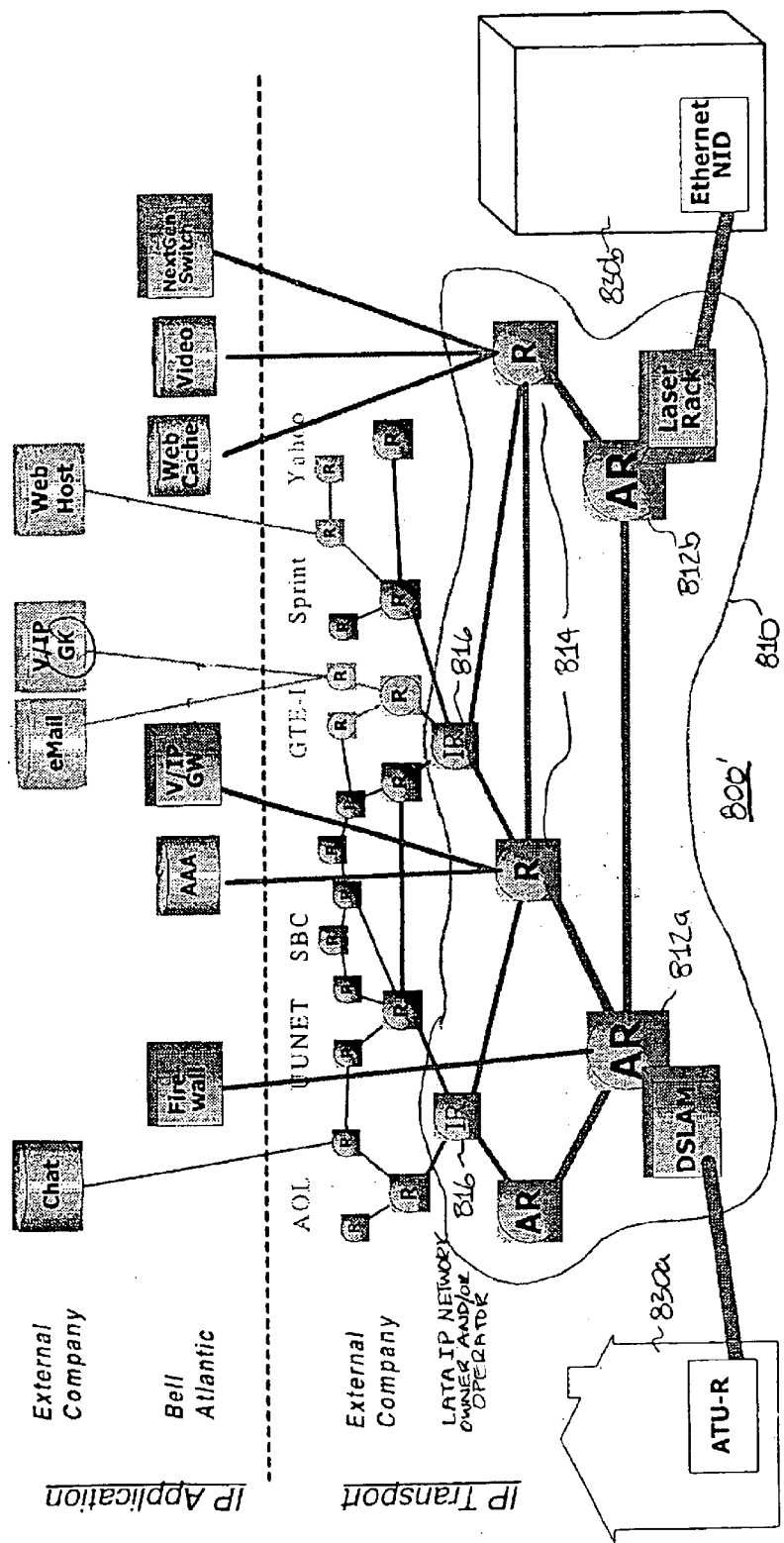
FIG. 9 is an example of the network of FIG. 8 in which services and applications are shown separated from transport.

FIG. 9 illustrates how the LATA IP network 810 can be used to separate transport facilities from applications and services. Again, the LATA IP network 810 may be defined, at least in part, by the access routers 812, the routers 814, and the interconnection routers 816. Notice that the networks of others, such as America On-Line, UUNET, SBC, GTE, Sprint and Yahoo may communicate with the LATA IP network 810 via the interconnection routers 816. As shown in the IP application section of FIG. 9, the LATA IP network 810 may provide firewall functionality (via access router 812), V/IP GW (voice over Internet—gateway), next generation switch functionality (via routers 814), AAA (authentication, authorization, and accounting), web caching and video storage facilities (via routers 814). The other companies may provide chat, e-mail, V/IP GK (voice over Internet—gatekeeper) and web hosting functionality via their own networks, and the interconnection routers 816.

§ 4.2 Functions Which May Be Performed By The Present Invention

The present invention may function to aggregate physical connections from customer (also referred to as "client") devices (Recall, e.g., 830 of FIG. 8.) for presentation to an access router (Recall, e.g., 812 of FIG. 8.) and to de-aggregate traffic from a shared link(s) from the access router. (Note that a given customer may have multiple devices. Note also that a given customer may have more than one service type/level.) The present invention may also function to limit or control access to various services thereby performing a firewall function. The present invention may also function to enable virtual private networks by preserving layer two (2) address information or a unique bit string (or context information) in the place of at least some information in the layer 2 header. The present invention may further function to help provide different quality of service levels. Finally, the present invention may function to control access to multicast groups.

§ 4.3 Exemplary Processes, Data Structures, Methods and Architecture for Effecting the Functions of the Present Invention

§ 4.3.1 Exemplary High Level Components and Processes

Figure 10:
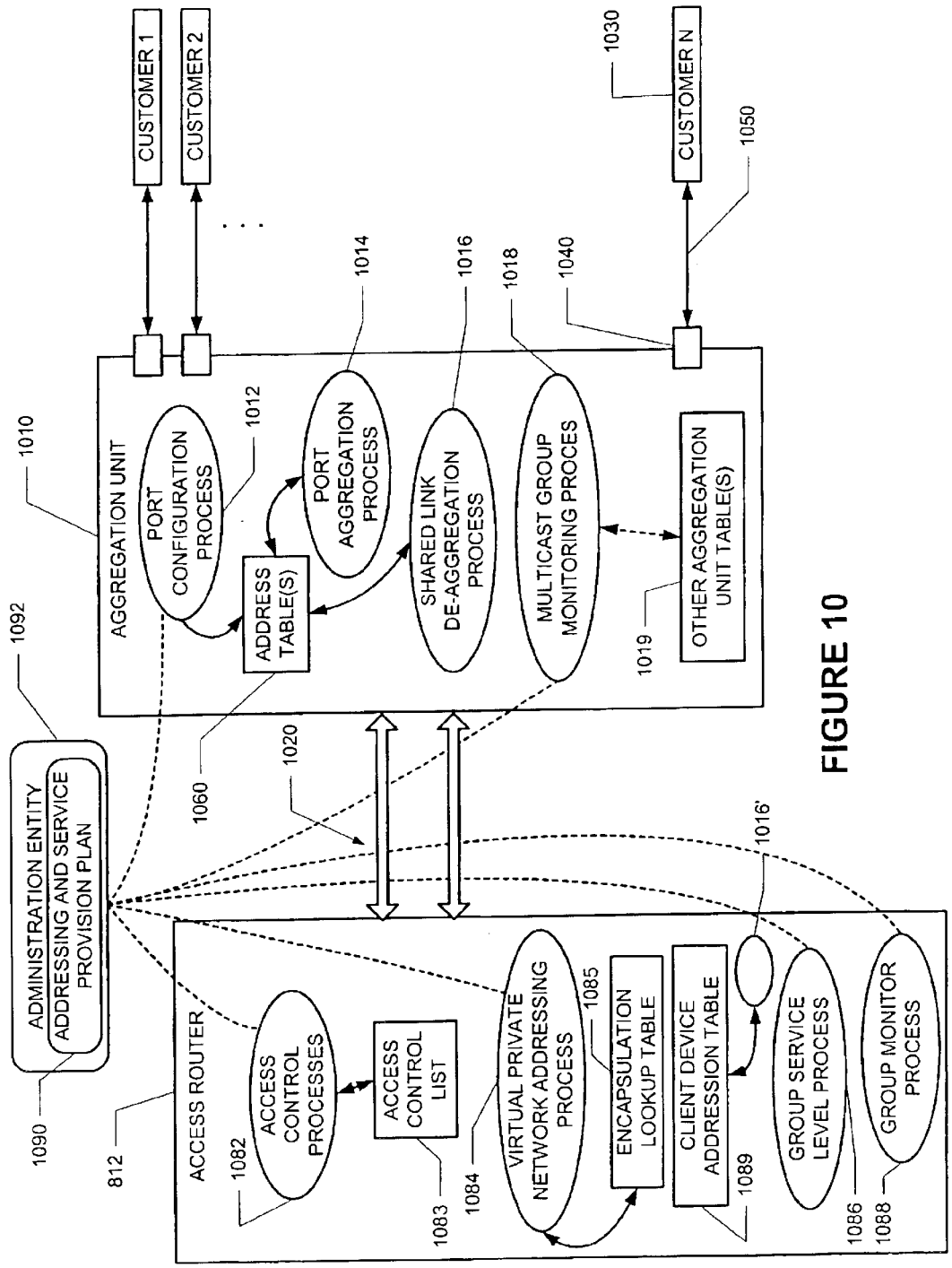
FIG. 10 is a high level diagram of processes that may be performed by various aspects of the present invention.

FIG. 10 illustrates connections to, and processes that may be performed by, an aggregation unit 1010 of the present invention, as well as processes which may be performed by an access router 812. The aggregation unit 1010 may be coupled with an access router 812 by one or more high bandwidth links 1020. Redundant links 1020 may be used. Further, links 1050 from a number of customers 1030 are coupled with ports 1040 of the aggregation unit 1010.

The aggregation unit 1010 may perform a port configuration process 1012 for creating an address table 1060 that may be used for enabling customer addressing, a port aggregation process 1014 which uses information in the address table 1060 (See e.g., FIG. 29 below.) to manage packets received from the ports 1040, a shared link de-aggregation process 1016 which uses information in the address table 1060 (See, e.g., FIG. 30 below.) to manage packets received from the access router 812, and a multicast group monitoring process 1018 for managing access to multicast information using a table 1019 (See, e.g., FIG. 31 below.).

Notice that the port configuration process 1012 and the multicast group monitor process 1018 may be controlled by, or operate in accordance with, an administration entity 1092 which may administer a plan 1090, as indicated by the dashed lines.

The access router 812 may perform an access control process 1082, based on an access control list 1083 (See, e.g., FIG. 32 below.), a virtual private network addressing process 1084 which may use an encapsulation lookup table 1085 (See, e.g., FIG. 33 below.), a group service level process 1086, and a group monitor process 1088 for monitoring the service provided to a group of customers. These processes may be controlled by, or may operate in accordance with, the plan 1090 of the administration entity 1092 as indicated by the dashed lines. As shown, a portion of the shared link de-aggregation process 1016' may be performed by the access router 812 based on a client device address table 1089. (See, e.g., FIG. 34 below.)

Having described, at a high level, processes that may be carried out by the aggregation unit 1010 and the access router 812, exemplary technologies for accessing the aggregation unit 1010 will be described in § 4.3.2. Then, an exemplary plan 1090, which may be produced and maintained by the administration entity 1092 will be described in § 4.3.3. Thereafter, an exemplary architecture of the aggregation unit 1010, as well as exemplary data structures of the address table(s) 1060 and other aggregation unit table(s) 1019, and exemplary methods for effecting the processes of the aggregation unit 1010 will be described in § 4.3.4. Finally, an exemplary architecture of the access router 812, as well as exemplary data structures of the access control list 1083, an encapsulation lookup table 1085 and an a client device addressing table 1089, and exemplary methods for effecting the processes of the access router 812 will be described in § 4.3.5.

§ 4.3.2 Exemplary Access Technologies

Figure 11:
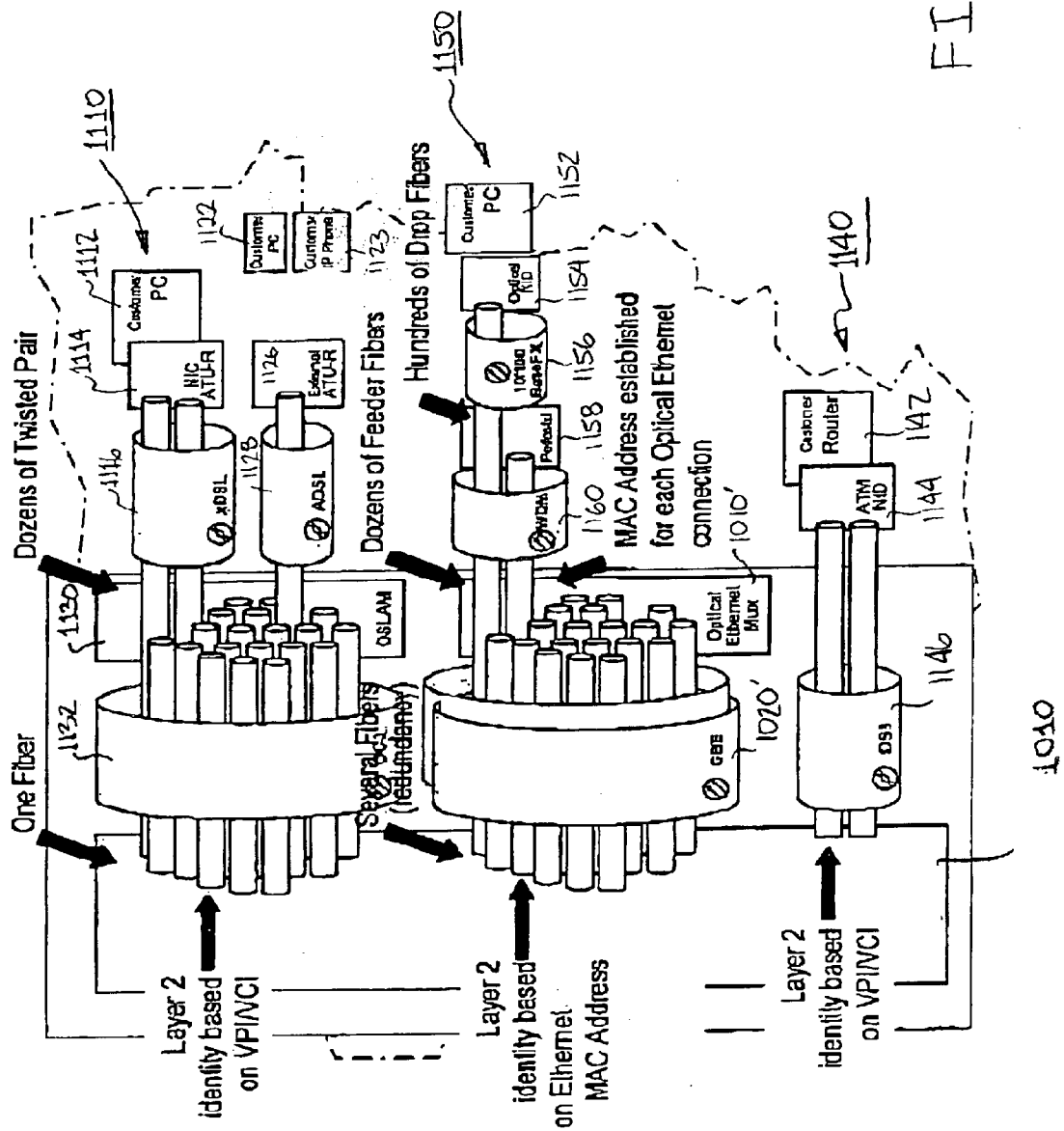
FIG. 11 illustrates how various access technologies may interface with an access router of the network of FIG. 8 or 9.

FIG. 11 illustrates the manner in which various types of access technologies may interface with an access router 812', via an aggregation unit 1010. To emphasize that the present invention accommodates different access technologies, and to illustrate its compatibility with legacy access technologies, FIG. 11 illustrates how the aggregation units 1010 of the LATA IP network can be used with existing (or "legacy") facilities (such as xDSL over ATM 1110 and native ATM 1140), as well as new access technologies (such as WDM of gigabit Ethernet (GbE) 1150).

In the xDSL over ATM access technology 1110, a customer's computer 1112 can access an aggregation unit 1010 via an XDSL transmission unit-remote at the customer premises, which transmits an ATM logical circuit (or VPI/VCI) 1117 over twisted pair supporting digital subscriber line (or "xDSL") service 1116, to a digital subscriber line access multiplexer (or "DSLAM") 1130, which connects to a fiber port (for example, OC-3) 1132 of the aggregation unit, via an ATM logical circuit.

In the ADSL over ATM access technology 1120, a customer's computer 1122 and Internet telephone 1123 can simultaneously access the aggregation unit 1010 via an ADSL transmission unit-remote ("ATU-R") 1126, over twisted pair 1116 supporting asymmetrical digital subscriber line (or "ADSL") service, the digital subscriber line access multiplexer (or "DSLAM") 1130 and the fiber port 1132.

In the ATM access technology 1140, a customer's router 1142 can access the aggregation unit 1010 via an ATM logical circuit 1144 that connects to a high bandwidth port (for example, a 44.736 Mbps DS3 digital line) 1146 on the aggregation unit 1010.

As noted in § 1.3.1 above, the present inventors believe that using DSLAMs with ATM ports is not the best or most cost-effective access technology. More specifically, the present inventors have recognized that IP routed Ethernet can offer greater bandwidth, faster failover, simpler operations, better scalability, and lower cost than ATM/SONET. Further, IP routed Ethernet may provide redundant management, bus and power.

Having introduced the ways in which legacy access facilities can interface with an aggregation unit 1010, an example of how an aggregation unit 1010' of the present invention may be used to permit new access facilities (such as WDM of gigabit Ethernet 1150) is now described. In the example in FIG. 11, a customer's computer 1152 may interface with the LATA IP network via an optical network interface device (or "NID") 1154, over 10/100 Base optical fiber 1156, to a pedestal (for splicing cables) 1158, that connects to a remote a wave division multiplexer (or "WDM") 1160, which connects to a gigabit Ethernet (or "GBE") port 1020' of the aggregation unit 1010'.

Notice that Ethernet LANs are employed. This is due to their perceived cost and performance advantages over other access technologies (such as those just listed above). Although Ethernet is known to those skilled in the art, it will be described briefly in § 4.3.2.1 below for the reader's convenience.

§ 4.3.2.1 Ethernet

Ethernet is a well-known and widely deployed local area network (or "LAN") protocol. Ethernet has a bus (as opposed to a ring or star) topology. Devices on an Ethernet LAN can transmit whenever they want to—if two (2) or more packets collide, each device waits a random time and tries again. more specifically, as defined in IEEE 802.3, Ethernet is a LAN with persistent carrier sense multiple access (or "CSMA") and collision detection (or "CD"). If a device wants to transmit, it "listens" to the cable (hence the term "carrier sense"). If the cable is sensed as being busy, the device waits of the cable to become idle. If the cable is idle, any connected device can transmit (hence the term "multiple access"). If two (2) or more devices begin to transmit simultaneously, there will be a collision which will be detected (hence the term "collision detection"). In the event of a collision, the devices causing the collision will (i) terminate their transmission, (ii) wait a random time, and (iii) try to transmit again (assuming that the cable is idle). Accordingly, a CSMA/CD cable or bus has one (1) of three (3) possible states—contention (or collision), transmission, or idle. Ethernet LAN interfaces, like some other LAN interfaces, may have a "promiscuous mode" under which all frames are provided to a device, rather than just those addressed to the device.

Figure 12:
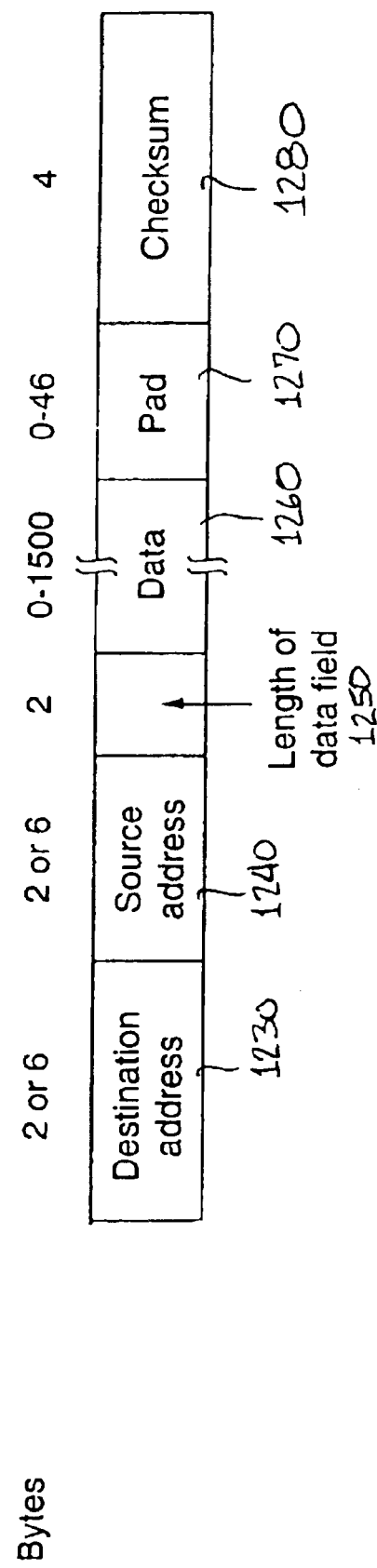
FIG. 12 illustrates fields of an Ethernet frame.

The IEEE 802.3 frame structure 1200 (or MAC Sublayer Protocol) is illustrated in FIG. 12. The source and destination addresses 1230 and 1240, respectively, may be six (6) bytes (or 48 bits) long. The second most significant bit is used to distinguish local addresses from global addresses. Thus, 46 bits are available for addresses (or about $7 \times 10^{13}$ unique addresses). Accordingly, any device can uniquely address any other device by using the right 48-bit address—it is up to the network layer to figure out how to locate the device associated with the destination address. The 48-bit address will be discussed in greater detail in § 4.3.2.1.1 below.

The two (2) byte length of data field 1250 indicates the number of bytes (between 0 and 1500) present in the data field 1260. At the end of the frame is the four (4) byte checksum field 1280 that can be used to detect errors in the frame. Between the data field and the checksum field is a pad field 1270 of variable length. This pad field 1270 is provided because valid frames 1200 must be at least 64 bytes long. Thus, if the data field 1260 is less than 46 bytes, the pad field 1270 is used to make both it and the data field 1260 at least 46 bytes.

§ 4.3.2.1.1 MAC Addresses

Recall that IEEE 802.3 may use frames 1200 which may include 48-bit addresses. These addresses may be referred to as media access control (or "MAC") addresses. Basically, each device that may be connected to a network or the Internet has an assigned unique MAC address. (Some bits of the MAC address are assigned to various device manufactures. The manufactures then ensure that each device manufactured by it has a unique MAC address.)

Although using Ethernet as an access technology to the LATA IP network introduced above is desirable from a cost and performance standpoint, there are certain challenges, met by the present invention, to using this access technology. More specifically, unlike legacy access technologies such as asynchronous transfer mode (or "ATM") which use end-to-end connections, the Internet protocol does not—it is only concerned with the next hop. This presents a challenge to the owner or operator of the LATA IP network because it cannot control the layer 2 (or MAC) and layer 3 (or IP) addresses. For example, because the MAC address is assigned to a hardware device such as a NIC, if the customer changes their NIC, their MAC address will change. If the customer adds another computer and a router, the MAC address will change to that of the router.

Regarding control by the owner or operator of the LATA IP network of the IP address, such an owner or operator may provide service to an Internet service provider (or "ISP") for example. Such ISPs typically reserve a number of IP addresses that are shared by all of their customers. In this way, the ISP can have more customers than reserved addresses. More specifically, the dynamic host control protocol (or "DHCP") permits the ISP to assign a temporary IP address (also referred to as a "dynamic address") to a subscriber. Even the option of providing each of an ISP's customers with its own static IP address would become unmanageable since every time the ISP added, deleted, or changed the IP address of a customer, the LATA IP network owner and/or operator would have to reconfigure the network.

In view of the foregoing, the present invention should function to aggregate a number of physical connections to one or more high bandwidth links to an access router. Preferably, the present invention should facilitate the deployment of Ethernet access technology. In this regard, the present invention should (i) maintain the identity of the customer device, and (ii) maintain address information for communications between the customer device and the access router 812'. This may be done in accordance with an administered plan, such as the one described in § 4.3.3 below. The aggregation unit 1010 of the present invention may accomplish these goals by identifying a physical or logical port to a customer and enabling the addressing of the port. Thus, in the present invention, the layer 2 (e.g., MAC) address is only unique within the segment to the access router 812'.

§ 4.3.3 Plan for Aggregation Addressing and Controlling the Provision of Service Levels The present invention may use a plan for forwarding a customer's IP traffic that (i) maintains the identity of the source of the packet (e.g., a customer), (ii) maintains information regarding where the traffic of the customer device enters and exits the LATA IP network, (iii) accommodates all layer 2 access technologies, and (iv) permits the provisioning of service levels to be controlled. An exemplary plan that may be used to accomplish these goals is described below.

§ 4.3.3.1 Plan for Identifying a Port to a Customer and to a Customer Device A plan 1090', which may be prepared by an administration entity 1092, may identify a logical port of the aggregation unit 1010 to each distinct logical circuit of traffic from a customer device. In this way, each logical port may be configured with enough information to identify the customer that it supports, and to identify that port in context of all other logical ports in the IP LATA network.

§ 4.3.3.1.1 Exemplary Specification for Identifying a Customer's Traffic

An exemplary set of information for such a logical port may include the physical interface to which the logical port is attached, the corresponding logical circuit information for the particular access technology, a unique identifier within the LATA IP network, the customer (for example, a service provider) that sources the IP traffic to the IP LATA network, and the virtual private network (or "VPN") that is the source or destination of IP traffic on the logical circuit.

An exemplary specification for such an information set may use: (i) a 32-bit logical port identifier (or address), which may identify 4,294,967,296 logical ports; (ii) a 24-bit organizational universal identifier (or "OUI") for the customer (or "VPN-OUI"), which may identify 16,777,216 customers; and (iii) a 32-bit VPN identifier (or VPN-Index), which may identify 4,294,967,296 VPNs per VPN-OUI.

The 32-bit logical port identifier (or address) may comprise 16 bits that define one of 65,536 geographic locations, 4 bits that identify one of sixteen (16) physical units to which the logical port is attached, and 12 bits that assign one of 4096 cardinal numbers to the logical port within its physical unit. Naturally, the bits of the logical port identifier may be provisioned based on ingress points, or expected future ingress points, to the network.

§ 4.3.3.1.2 Exemplary Plan for Conveying a Customer's Identifying Information The present invention may convey the customer addressing information among network elements of the LATA IP network using a customer addressing protocol that wholly encapsulates the customer's original IP traffic.

The customer addressing protocol may obtain information from the logical port corresponding to a customer's logical circuit.

The customer addressing protocol may be in a form of an existing layer 2 (e.g., MAC) address or some other unique bits (or context information) in the place of, or in addition to the layer 2 address.

Figure 13:
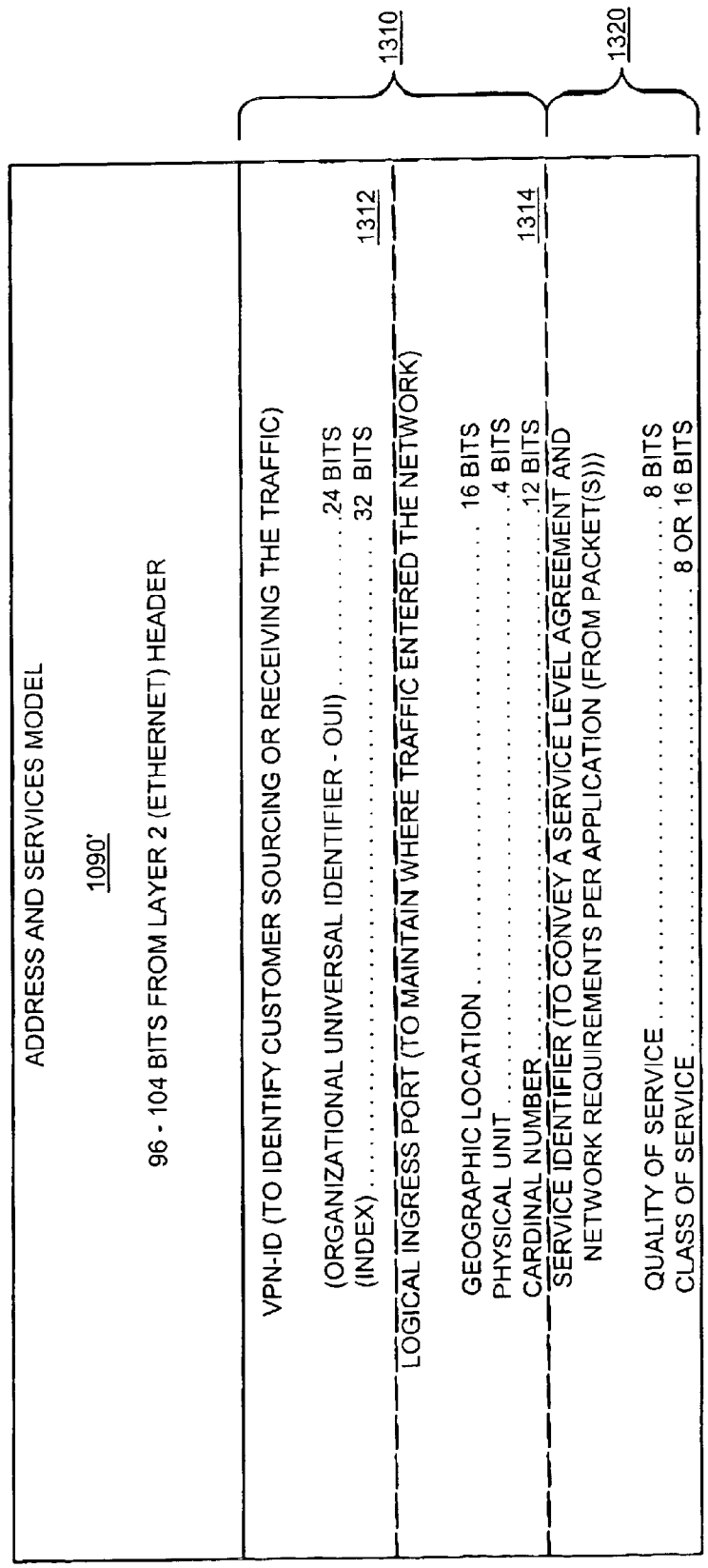
FIG. 13 illustrates an exemplary data structure specification of a unique bit string (or context information) that may be used in the present invention and that may be administered in accordance with a network-wide plan.

FIG. 13 shows an exemplary data structure 1310 for conveying a customer's identifying information 1312 and customer device addressing information 1314. In an exemplary protocol, the data structure 1310 is part of a modified Ethernet frame, specifically 88 bits of the 96 bits of addressing space of the header. The exemplary protocol replaces the addressing information with a 24-bit field for the VPN-OUI, a 32-bit field for the VPN-Index, and a 32-bit field for the logical port on which the traffic entered the network (or "logical ingress port"). This is illustrated in FIG. 36. By conveying this information within a modified Ethernet frame, the aggregation unit and access router can use any data communications technology that supports Ethernet encapsulation of an IP packet. That is, the footprint of the Ethernet frame is not changed.

This information, in its complete or partial form, may remain attached to the original IP packet throughout the LATA IP network.

Finally, since the information 1310 does not depend on the contents of a received packet(s), but rather only on the logical port, this part 1310 of the context information can be thought of as a packet-independent part.

§ 4.3.3.2 Plan for Identifying a Customer's Service Levels

The present invention may provide for various levels of service. In the example disclosed, two kinds of service levels are provided: i) quality of service; and ii) class of service. Quality of service (or "QoS") defines the network requirements necessary to satisfy certain performance requirements associated with an IP application, for example voice over IP. Quality of service may be derived from layer 3 and/or 4 information in a received packet(s) and can therefore be thought of as a packet-dependent part of the context information. Class of service (or "CoS") defines the priority that a customer's IP traffic has within a network. Class of service levels may be customer-selected and can be thought of as a service bundle or service level agreement (which may be ordered and, optionally, modified by the customer). Since class of service does not depend on information in a received packet(s), it can be thought of as a packet-independent part of the context information.

The group service level process 1086 may require service level information (in addition to the customer device addressing and customer service agreement information). The service level plan may be prepared by an administration entity 1092, may identify a packet's QoS by the nature of its IP application (Recall packets layer 3 and/or 4 information.), and may identify the same packet's CoS by reference to additional customer information (e.g., associated with the logical port).

§ 4.3.3.2.1 Exemplary Specification for Identifying a Customer's Service Levels Given that there is a finite set of popular IP applications, and that a taxonomical classification of these applications yields a finite set of application types, an exemplary set of QoS levels may include 256 levels, each of which corresponds to a type of IP application. Upon receipt of customer traffic, the aggregation unit may determine an 8-bit QoS type by examining the layer 3 protocol field and/or the layer 4 port field.

Since CoS may be customer-selected, it may be part of the customer information set associated with a logical port. The CoS for a logical port may use an 8-bit or 16-bit designation, which may serve 256 or 65,536 possible CoS levels, respectively.

§ 4.3.3.2.2 Exemplary Protocol for Conveying a Customer's Service Levels

The present invention may convey the service level information among network elements of the LATA IP network by extending the context information including the customer identifying and customer device addressing information to further convey service level information which may include, or be derived from, quality of service and/or class of service information.

FIG. 13 shows an exemplary data structure for conveying service level information 1320 as an extension to a customer identifying and customer device addressing part 1310 of the context information. In this exemplary embodiment, the context information is extended to include an 8-bit QoS field and an 8-bit or 16-bit CoS field. The 8-bit (supporting 256 levels) QoS field fits into the remaining unused bits (88+8= 96) of the 96-bit Ethernet addressing space. The 8-bit or 16-bit class of service (CoS) information may be placed into the Tag ID field of an 802.1Q VLAN tag, attached to the Ethernet frame. (See, e.g., FIG. 36.) Alternatively, if an 8-bit CoS is used, the CoS information may be placed into the LLC SSAP (link layer control—subsystem service access point) field of the Ethernet header.

As with the basic context information including customer identifying information 1312 and customer device addressing information 1314, the context information as extended to include service level information 1320 may remain attached to the original IP packet throughout the LATA IP network.

§ 4.3.4 Exemplary Aggregation Unit

In the following, an exemplary architecture of the aggregation unit 1010' is described in § 4.3.4.1 with reference to FIGS. 14 through 18. Then, an exemplary data structure for the address table 1060 is described in § 4.3.4.2 with reference to FIGS. 29 and 30. Thereafter, exemplary methods for effecting the processes of the aggregation unit are described in § 4.3.4.3 with reference to FIGS. 20 through 24.

§ 4.3.4.1 Exemplary Architecture

Figure 14:
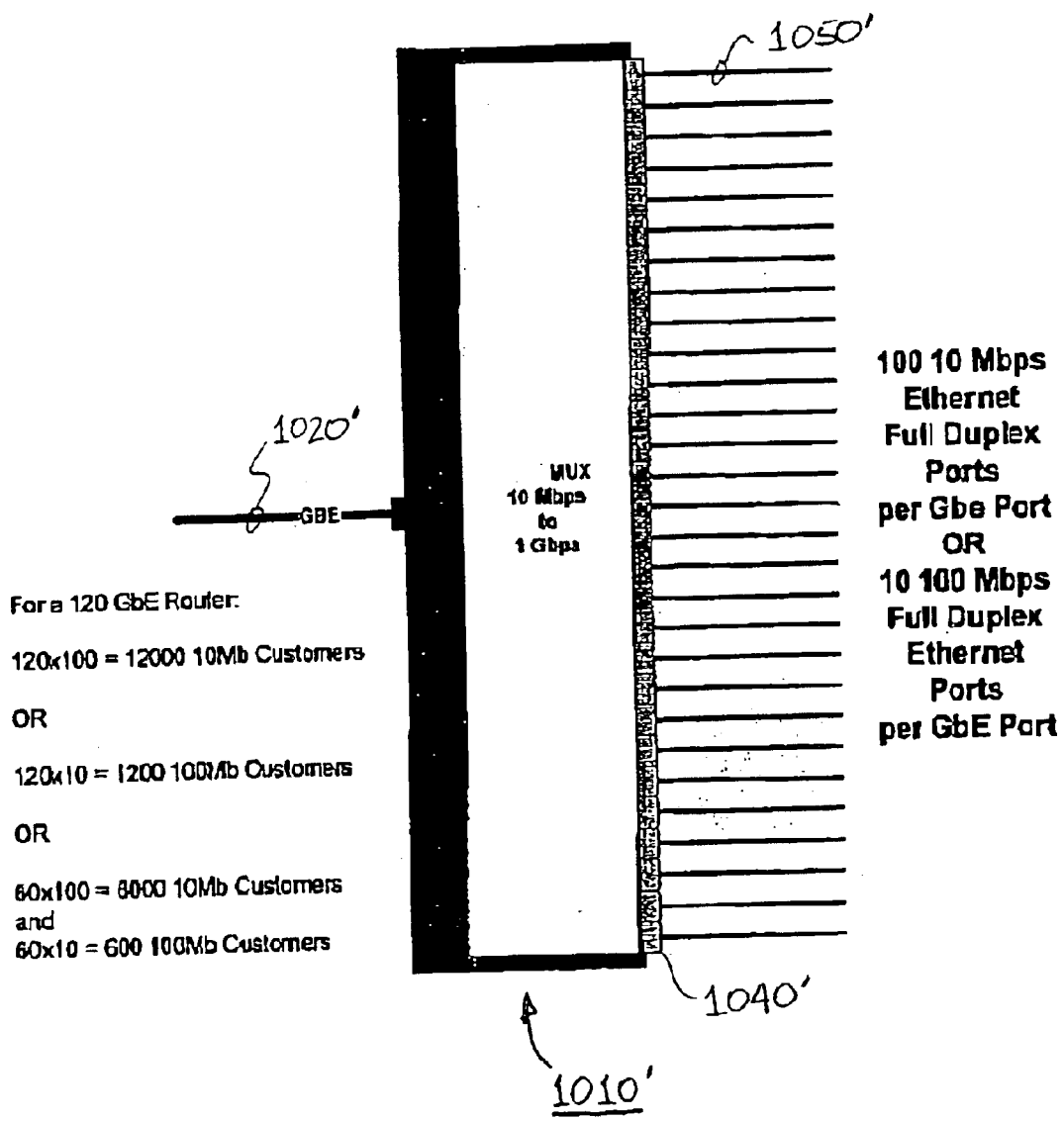
FIG. 14 is a high-level block diagram of an exemplary aggregation unit.

FIG. 14 is a high-level block diagram which illustrates connections to an exemplary aggregation unit 1010'. On the right side of the aggregation unit 1010', 100 10 Mbps full duplex ports 1040' per 1 Gbe port or 10 100 Mbps full duplex ports per Gbe port may be provided for lines 1050'. On the left side of the aggregation unit 1010', a gigabit Ethernet (or "GBE") link 1020' is provided to the access router (not shown). The aggregation unit 1010' may use time division multiplexing, space division multiplexing (or channelizing), statistical multiplexing, or another type of multiplexing to aggregate traffic from the lines 1050' to the link(s) 1020'. The aggregation unit 1010' may be a line speed, non-blocking, unit. In this case, assuming sufficient bandwidth on the link(s) 1020', 12,000 half-duplex (or 6,000 full-duplex) 10 Mbps customers or 1,200 half-duplex (or 600 full-duplex) 100 Mbps customers could be accommodated by a 120 GBE access router. Alternatively, the aggregation unit 1010' may concentrate traffic. By providing access facilities capable of providing bandwidth that should meet the demands of most foreseeable applications, the present invention will allow service levels provided to the customer to be changed without changing the access facilities. Thus, for example, a customer could request changes in available bandwidth in real time (e.g., via a web interface) that change the configuration of the logical port (Recall, e.g., plan part 1312 and/or 1320 of FIG. 13.) to which the customer is connected.

Figure 15:
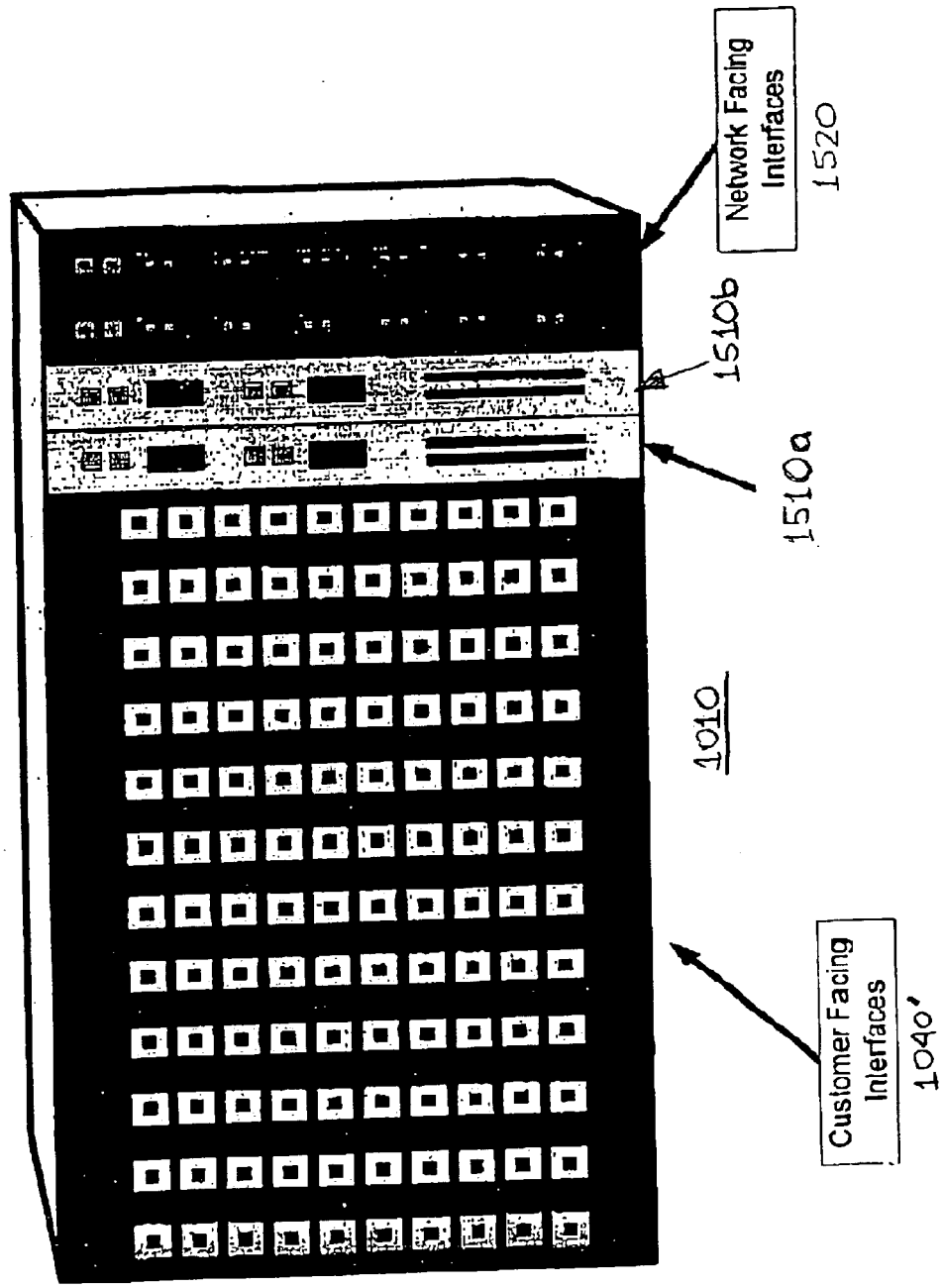
FIG. 15 illustrates a physical implementation of an exemplary aggregation unit.

FIG. 15 illustrates an exemplary chassis implementation for an aggregation unit 1010'. Network facing interfaces 1520 terminate the high bandwidth link(s) 1020' to the access router. Management cards 1510 may be provided for storing information associated with the ports 1040' (e.g., the logical interfaces associated with each port). As will be described in § 4.3.4.3 below, this information may be assigned during an initial configuration and/or during ongoing polling operations. A first management card 1510*a* mirrors a second 1510*b*. In this way, if one management 1510 card fails, it can be removed, a new card can be installed, and information can be copied to the newly installed card, thereby simplifying maintenance and eliminating any downtime. To the left of the management cards 1510 are ports 1040' for terminating lines from the customers.

In each case, the ports 1040' and network interfaces 1520 have no initial configuration. Upon startup or installation, they query the active management card 1510 for configuration based on their location in the chassis. Thus, for example, a logical interface can be assigned to ports based on their location within the LATA IP network (Recall plan part 1314 of FIG. 13.), rather than solely based on the physical interface card. The bits assigned may be within a range of bits (or one or more bits of the context information) associated with services with which the customer wants. (Recall administration plan 1090' of FIG. 13.) As discussed above with reference to FIG. 14, in one exemplary embodiment, the ports 1040 may be 10 or 100 Mbps cards, while the network interfaces 1520 may be 1 Gbps cards.

Figure 16:
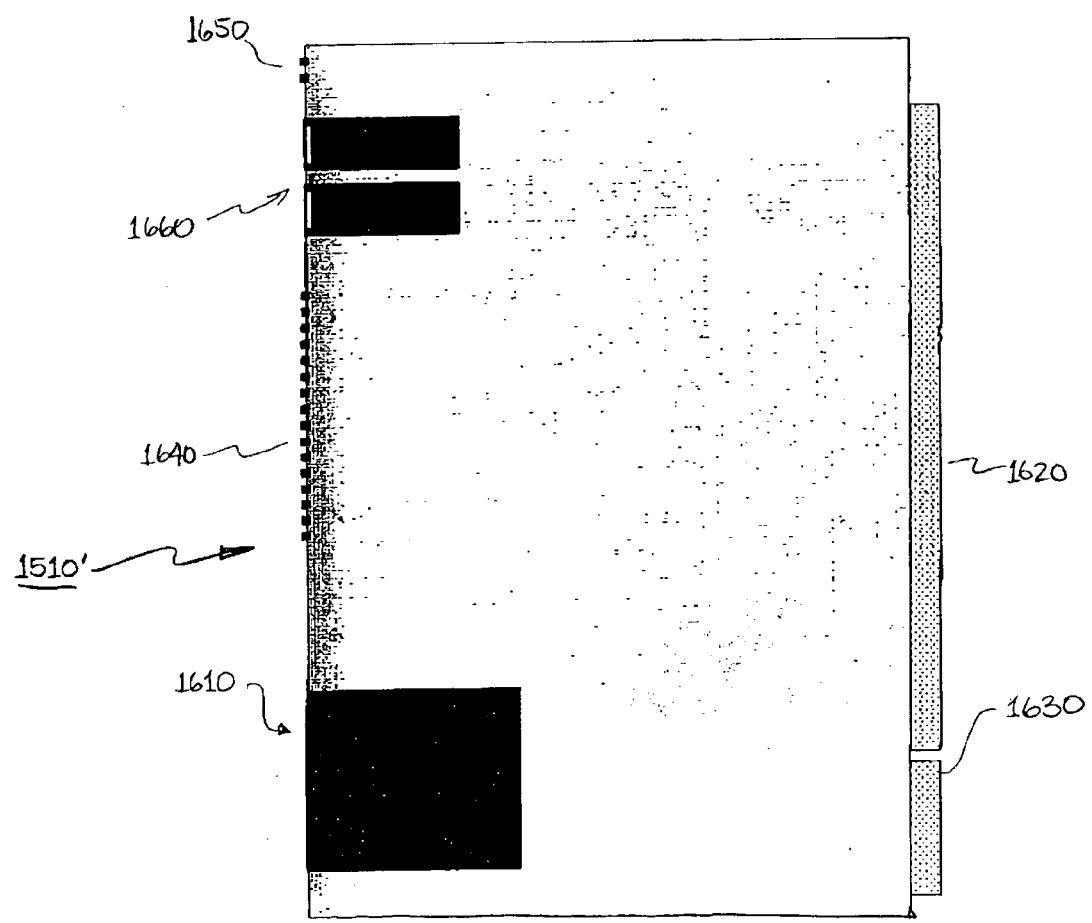
FIG. 16 illustrates an exemplary implementation of management cards in the exemplary aggregation unit of FIG. 15.

FIG. 16 is an exemplary management card 1510'. The management card includes a data plane 1620, a management plane 1630, flash memory 1610, indicators 1640 and 1650, such as visual indicators like LEDs for example, and management interfaces 1660.

Figure 17:
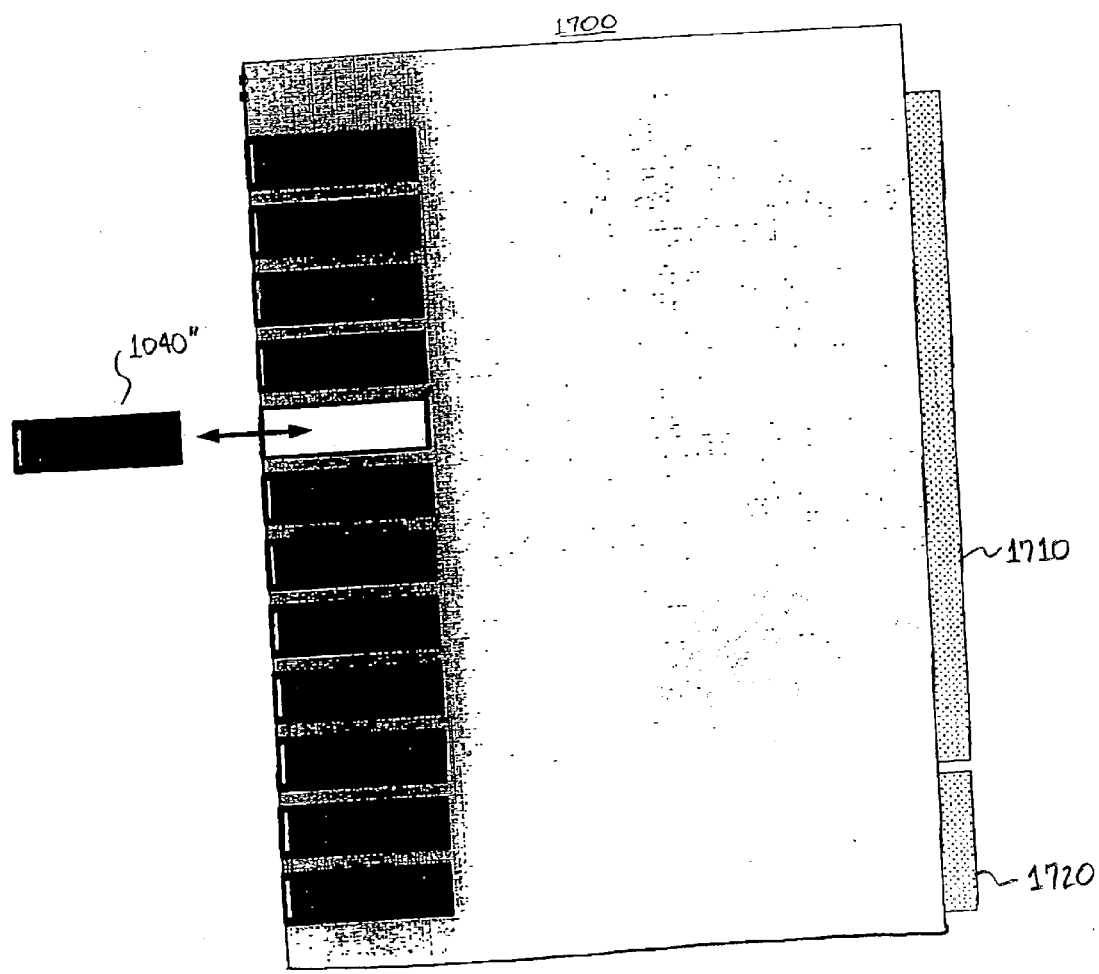
FIG. 17 illustrates an exemplary implementation of customer facing interfaces (or ports) in the exemplary aggregation unit of FIG. 15.
Figure 18:
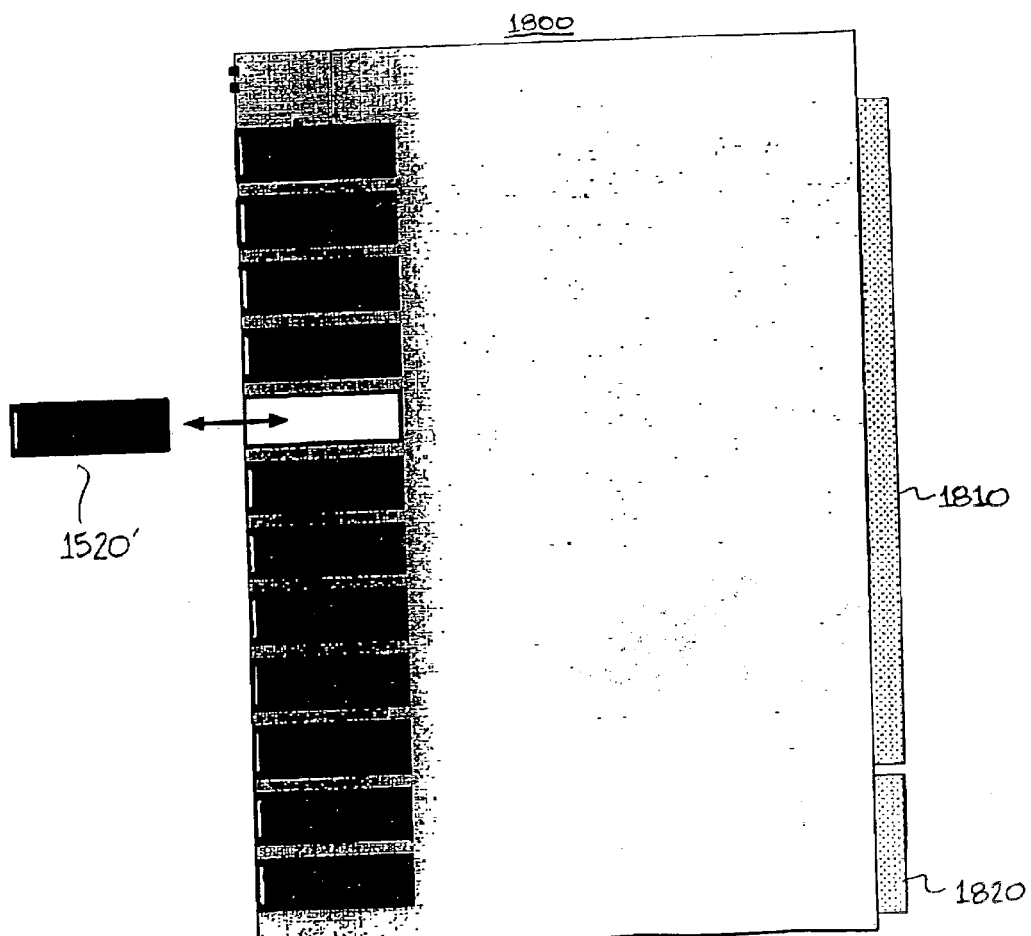
FIG. 18 illustrates an exemplary implementation of network facing interfaces in the exemplary aggregation unit of FIG. 15.

FIG. 17 is an exemplary customer interface card 1700 which includes a data plane 1710, a management plane 1720, and a number of hot swappable customer ports 1040". Similarly, FIG. 18 is an exemplary network interface card 1800 which includes a data plane 1810, a management plane 1820, and a number of hot swappable network interface ports 1520'.

Basically, processor(s), application specific integrated circuit(s), programmable logic array(s), and/or other hardware and/or software may be used to effect the processes of the aggregation unit.

§ 4.3.4.2 Exemplary Address Table Data Structure

FIGS. 29 and 30 illustrate exemplary address tables 1060' and 1060", respectively, which may be generated, maintained, and used by the aggregation unit 1010. More specifically, these tables 1060' and 1060" may be configured by the port configuration process 1012. The table of FIG. 29 may be used by the port aggregation process 1014, and the table of FIG. 30 may be used by the shared link de-aggregation process 1016.

As shown in FIG. 29, the table 1060' may include a column 2910 of logical interface or port numbers, a column 2920 of virtual private network identifier organizational universal identifiers (VPN-OUI), a column 2930 of virtual private network identifier indexes (VPN-Index), a column 2940 of customer layer 3 (e.g., IP) addresses, a column 2950 of class of service levels, a column 2960 of multicast access control list (ACL) groups, a column 2970 of quality of service (QoS) profiles, a column 2982 of virtual path identifiers (VPIs), a column 2984 of virtual channel identifiers (VCIs), a column 2986 of permanent virtual circuits (PVCs), and a column 2988 of Ethernet ports. The logical port number 2910 may be associated with a physical interface 1040' location on the chassis. (Recall plan part 1314 of FIG. 13.) The VPN-OUI 2920 and VPN-Index 2930 are also assigned to the port (logical interface) 1040' by the management card 1510. This assignment may be done during initial configuration of the aggregation unit 1010'. Referring to both FIG. 13 and FIG. 29, notice that: the VPN-OUI column 2920 may correspond to 24 bits of the context information; the VPN-Index column 2930 may correspond to 32 bits of the context information; the VPI 2982, VCI 2984, PVC 2986, and/or ethernet port 2988 columns may correspond to other bits of the context information; and the service level 2950, multicast access control list group 2960, and/or quality of service profile 2970 columns may correspond to other various bits of the context information. To reiterate, the table 1060' of FIG. 29 may be used by the port aggregation process 1014 to aggregate packets from a number of logical interfaces or ports onto a link to the access router 812.

As shown in FIG. 30, the table 1060" may include a column 3010 of logical interfaces (each of which may correspond to a physical port), a column 3020 of layer 2 (e.g., MAC) addresses assigned to each of the network-side interfaces or ports of the aggregation unit, a column 3030 of IP addresses with which one or more client device may be associated, a column 3040 of subnet masks which may be used to mask out non-relevant portions of a layer 3 (e.g., IP) address, and a column 3050 of client device layer 2 (e.g., MAC) addresses. A layer 3 (e.g., IP) address of column 3030 and a client device layer 2 (e.g., MAC) address of a client of column 3050 may have a one-to-one or one-to-many relationship. For example, if a single device, such as a customer computer or a company router is always connected to the port, then its IP address and its static associated layer 2 (e.g., MAC) address will be provided in columns 3030 and 3050. If, on the other hand, a customer is assigned a dynamic IP address (by its Internet service provider (or "ISP") and that customer is connected with the port through its ISP, for example), then the IP address of column 3050 may have the layer 2 (e.g., MAC) address of a customer currently associated with that IP address (of the ISP's router for example). The information in these columns 3030 and 3050 may be populated by information returned in response to address resolution broadcasts (e.g., ARPs), and/or by information gleaned by examining inbound packet(s) (or "snooping"). The address table 1060" may be used by the shared link de-aggregation process 1016 for example, to forward a packet to the proper logical interface or port and to replace the packet's layer 2 (e.g., MAC) destination address (or other information in the place of the layer 2 destination address) with that of the customer currently associated with the layer 3 (e.g., IP) address.

§ 4.3.4.3 Exemplary Methods for Effecting Aggregation Unit Processes

In the following, an exemplary method that may be used to effect the logical port or interface configuration process 1012 is described in § 4.3.4.3.1 with reference to FIGS. 13 and 20. An exemplary method that may be used to effect the logical port or interface aggregation process 1014 is described in § 4.3.4.3.2 with reference to FIGS. 21 and 29. An exemplary method that may be used to effect the shared link de-aggregation process 1016 is described in § 4.3.4.3.3 with reference to FIGS. 22 and 30. Finally, an exemplary method that may be used to effect the multicast group monitoring process 1018 is described in § 4.3.4.3.4 with reference to FIGS. 23 and 31. Generally speaking, processor(s), application specific integrated circuit(s), programmable logic array(s), and/or other hardware and/or software may be used to effect the processes of the access router.

§ 4.3.4.3.1 Exemplary Logical Port or Interface Configuration Method

Figure 20:
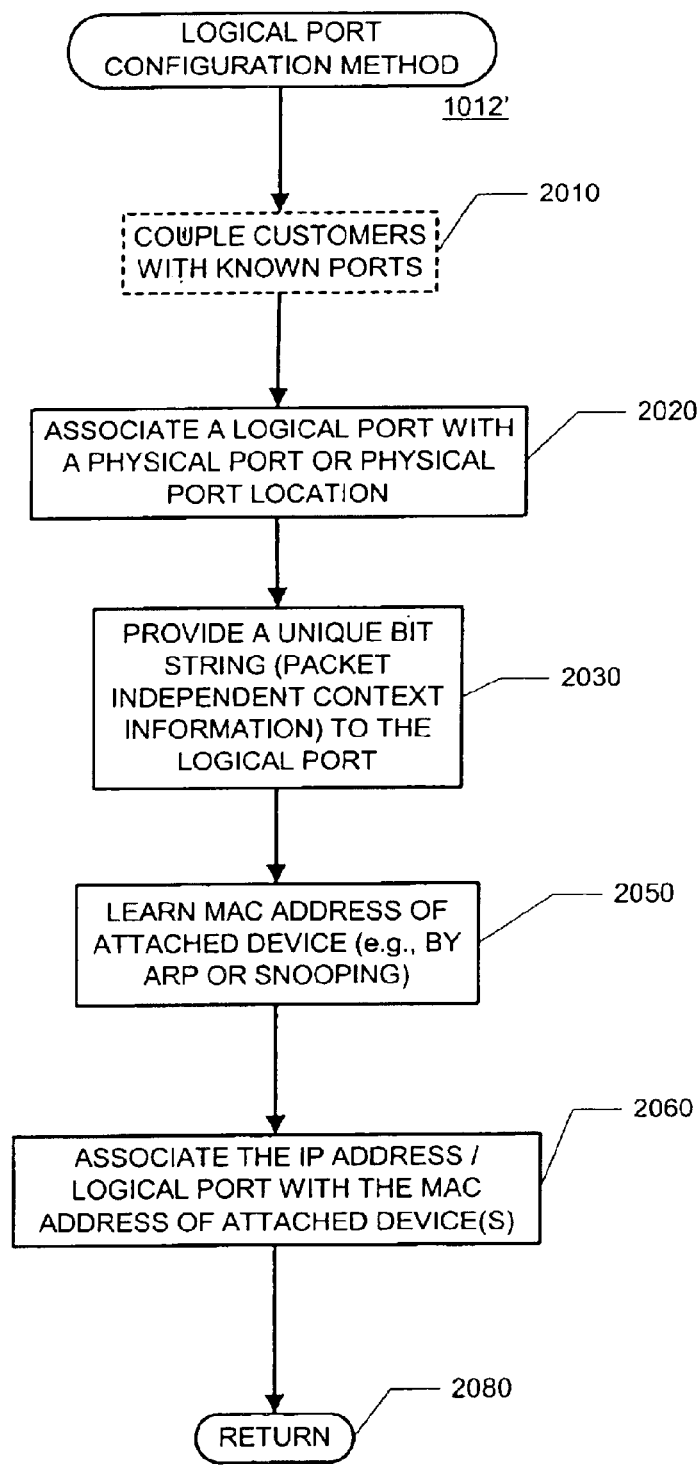
FIG. 20 is a flow diagram of an exemplary method that may be used to effect a logical port configuration function.

FIG. 20 is a flow diagram of an exemplary method 1012' which may be used to effect the port configuration process 1012. As shown in optional step 2010, customers are coupled with ports. More specifically, lines, such as fiber optic lines or copper lines for example, carrying customer traffic are terminated at the ports 1040 of the aggregation unit. A logical port is associated with a physical port or a physical port location as shown in block 2020. (Recall plan part 1314 of FIG. 13.) Customer identifying information and logical ingress port information (Recall parts 1312 and 1314 of FIG. 13.) may be provided, as a unique bit string (or context information), to the logical port, as shown in step 2030. Further, class of service information (Recall part 1320 of FIG. 13.) may be provided to the logical port. Thus a packet-independent part of context information is associated with the logical port at this point. The method 1012' learns the MAC address of an attached device by, e.g., periodically polling the attached device(s) for its layer 2 (e.g., their MAC) address(es) using its currently assigned layer 3 (e.g., IP) address (e.g., ARPing), and/or by examining the contents of an inbound packet(s) (e.g., snooping) as shown in step 2050. (Recall column 3050 of FIG. 30. The layer 2 address (e.g., the MAC address) of the customer device is then associated with the layer 3 address (e.g., IP address), as shown in step 2060. (Recall columns 3030 and 3050 of FIG. 30.) The method 1012' is left via RETURN node 2080 and may be executed as logical ports are added. At this point, the columns of the tables illustrated in FIGS. 29 and 30 should be populated.

Note that the method 1012' can determine the physical port location and unique bit string (Recall steps 2020, 2030) at one time, for example upon startup of the aggregation unit or when a new customer is added to the aggregation unit. However, the determination of the layer 2 addresses of the attached device(s) then associated with the layer 3 addresses should take place periodically. In one alternative, all of the ports periodically poll attached device(s) for its layer 2 address. This polling should occur frequently enough so when the access router 812' asks it (using for example, an address resolution) for these addresses, they are up to date.

§ 4.3.4.3.2 Exemplary Port Aggregation Method

Figure 21:
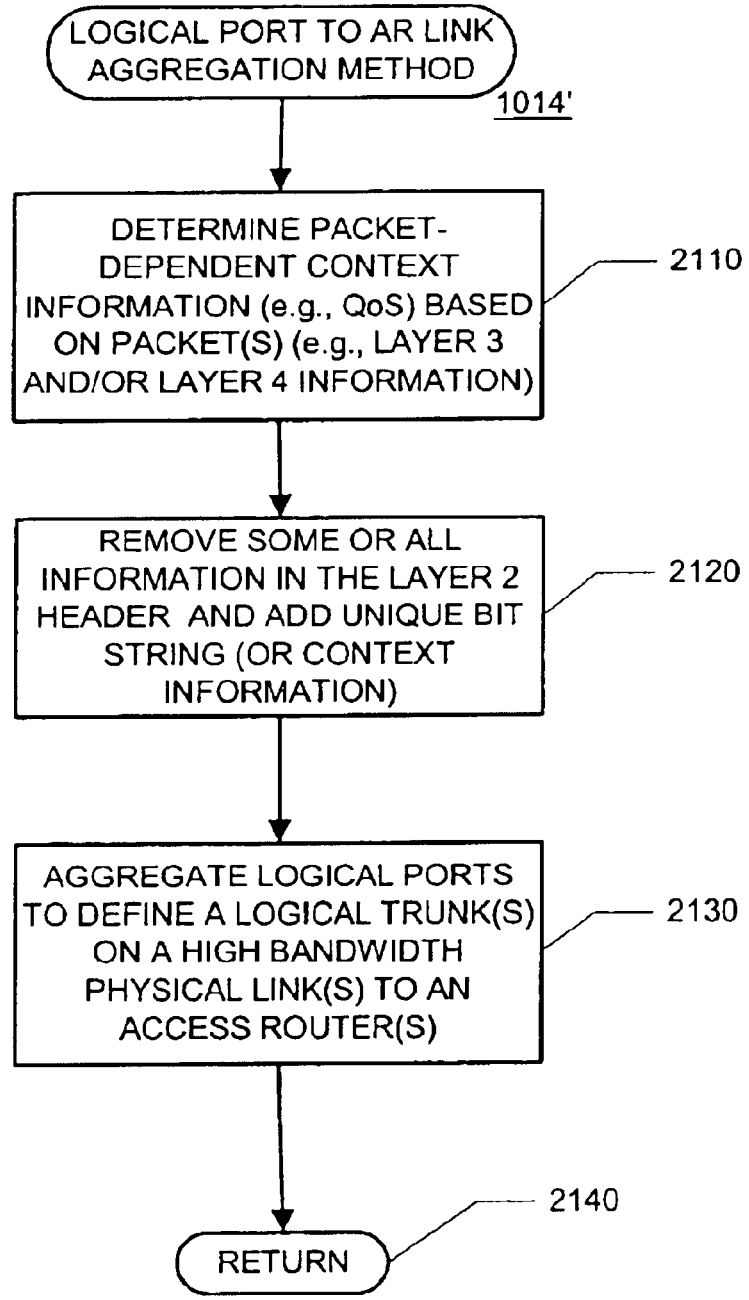
FIG. 21 is a flow diagram of an exemplary method that may be used to effect a logical port aggregation function.

FIG. 21 is a flow diagram of an exemplary method 1014' that may be used to effect the port aggregation process 1014' in response to a packet(s) received from a customer and entering the network. In step 2110, packet-dependent context information (Recall, e.g., QoS of FIG. 13.) is determined based on (e.g., layer 3 and/or layer 4 information of) the packet(s) received. In step 2120, information in the original layer 2 (e.g., MAC addresses) header of the packet is removed and the context information is added. The context information may include the part assigned to the logical port or interface (packet-independent part) and the part determined in step 2110 (packet-dependent part). (See, e.g., FIG. 36.) For example, the layer 2 (e.g., MAC) address assigned to the customer device (as well as the layer 2 (e.g., MAC) address assigned to the port) may be replaced with a unique bit string (or context information) (e.g., corresponding to the values in columns 2920, 2930, 2950 and 2960 of FIG. 29) associated with the logical port or interface number (See, e.g., column 2910 of FIG. 29.) associated with the physical port 1040 to which the customer is connected, as well as values (e.g., in columns 2970, 2982, 2984, 2986 and 2988 of FIG. 29) derived from layer 3 and/or layer 4 information in the packet(s). Then, in step 2130, traffic on all of the logical ports or interfaces is aggregated on to logical channels on a high bandwidth physical link to an access router 812'. This aggregation may be done via multiplexing, such as space division multiplexing (channelizing via, e.g., frequency division multiplexing, wavelength division multiplexing, etc.), time division multiplexing, or statistical multiplexing for example. As discussed above, in one exemplary embodiment, this aggregation may be done at line speed, without concentration. The method 1014' is then left via RETURN node 2140. To reiterate, FIG. 36 illustrates an example of how an incoming packet may be modified by this process 1014.

§ 4.3.4.3.3 Exemplary Shared Link De-Aggregation Method

Figure 22:
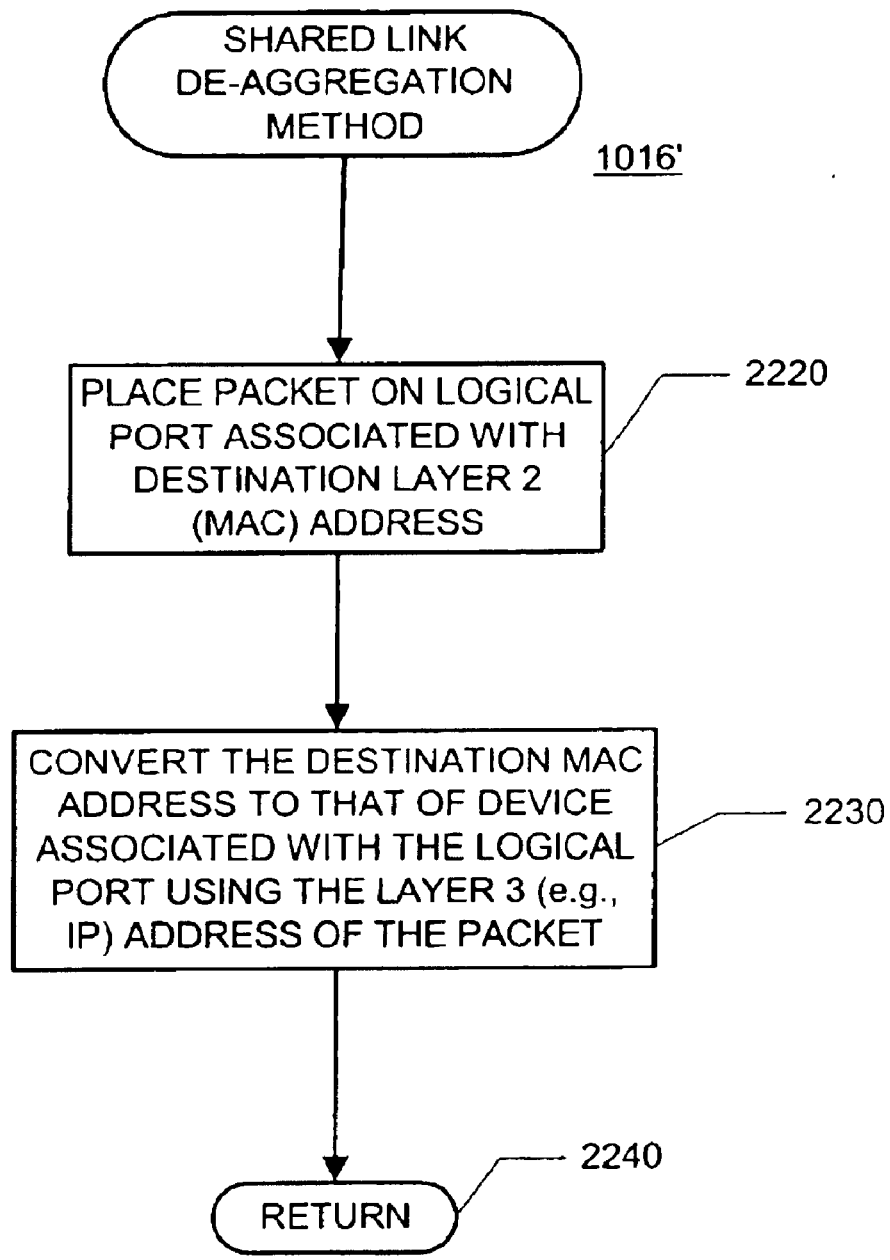
FIG. 22 is a flow diagram of an exemplary method that may be used to effect a link de-aggregation function.

FIG. 22 is a flow diagram of an exemplary method 1016' which may be used to effect the shared link de-aggregation process 1016 which may be executed in response to a packet being received from the network (destined for a customer). If a packet has been received from the network, in step 2220, the packet is placed on the logical port or interface (See, e.g., column 3010 of FIG. 30.) associated with the information in the layer 2 header of the packet. (Recall, e.g., part 1314 of FIG. 13.) Then, in step 2230, the destination layer 2 (e.g., MAC) address of the packet is changed to that of the customer device associated with the logical port or interface. More specifically, referring to FIG. 30, the layer 2 (e.g., MAC) address of the network side port in column 3020 will be replaced with the layer 2 (e.g., MAC) address of the customer device in column 3050 based on the logical port 3010 (and IP address 3030). The method 1016' is then left via RETURN node 2240.

§ 4.3.4.3.4 Exemplary Multicast Group Monitoring Process

Figure 23:
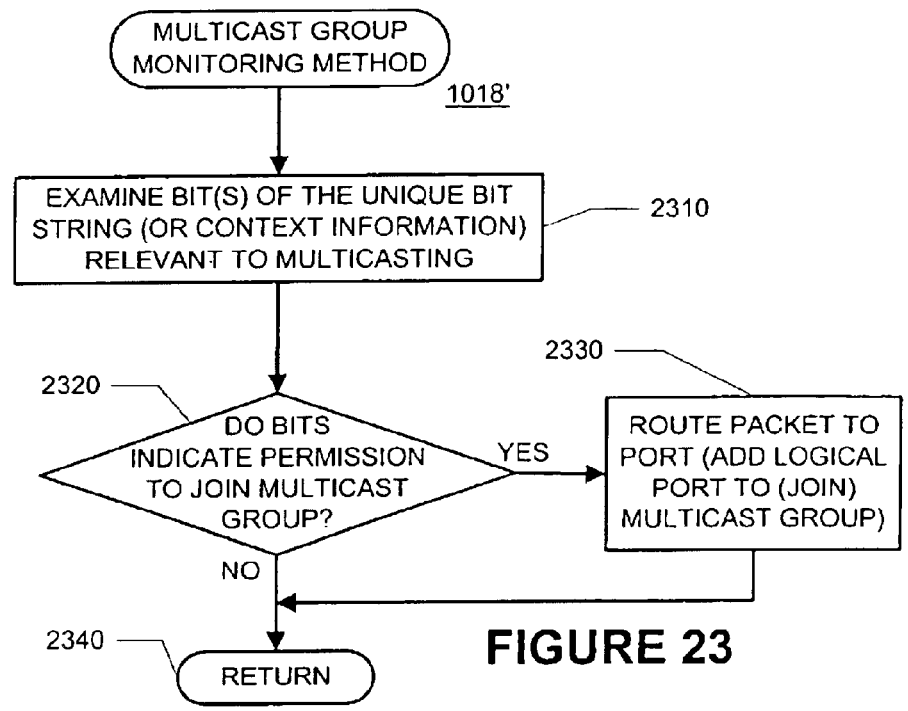
FIG. 23 is a flow diagram of an exemplary method that may be used to effect a multicast group monitoring function.

FIG. 23 is a flow diagram of an exemplary method 1018' that may be used to effect the multicast group monitoring process 1018. Although multicasting using TCP/IP is known to those skilled in the art, it is introduced here for the reader's convenience.

Figure 4:
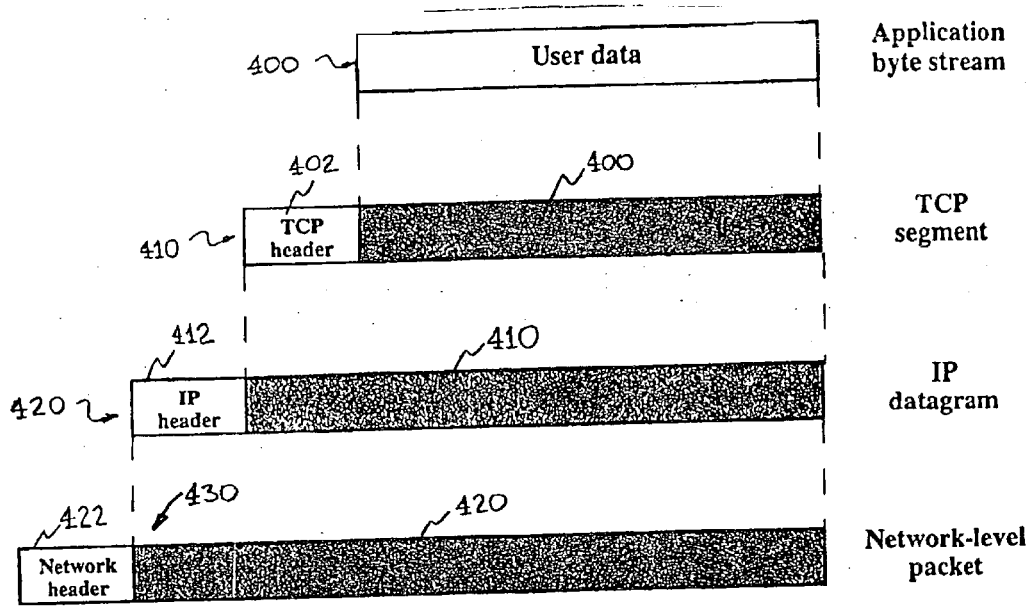
FIG. 4 illustrates the manner in which data is encapsulated by a TCP header, an IP header, and a network header in accordance with the TCP/IP protocol suite.
Figure 5:
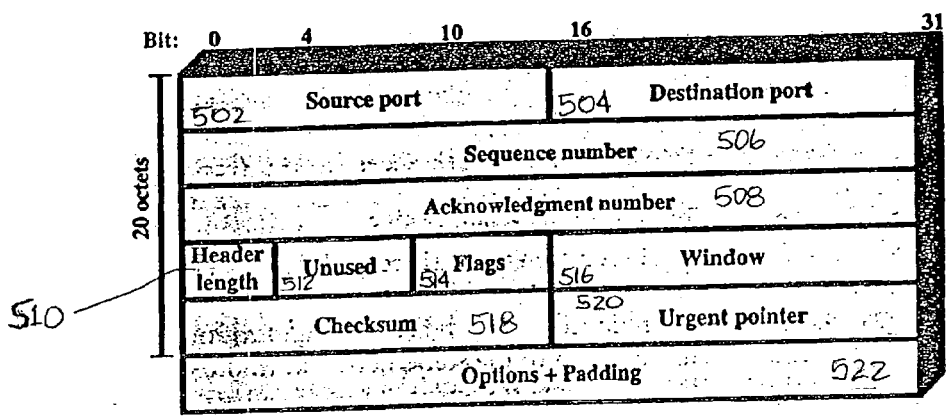
FIG. 5 illustrates the fields of a TCP header.
Figure 6A:
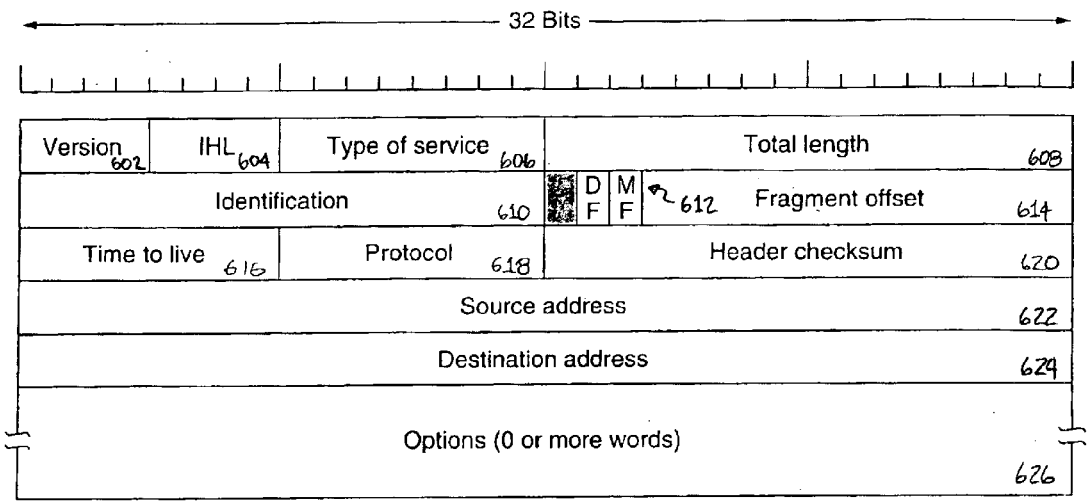
FIGS. 6A and 6B illustrate the fields of Version 4 and Version 6, respectively, of the IP header.
Figure 6B:
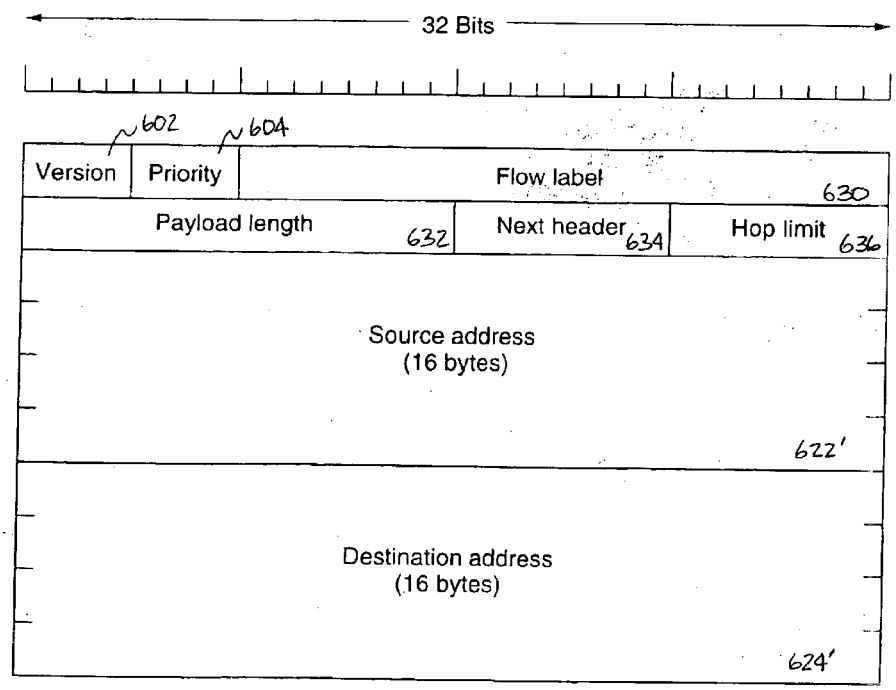
Figure 7B:
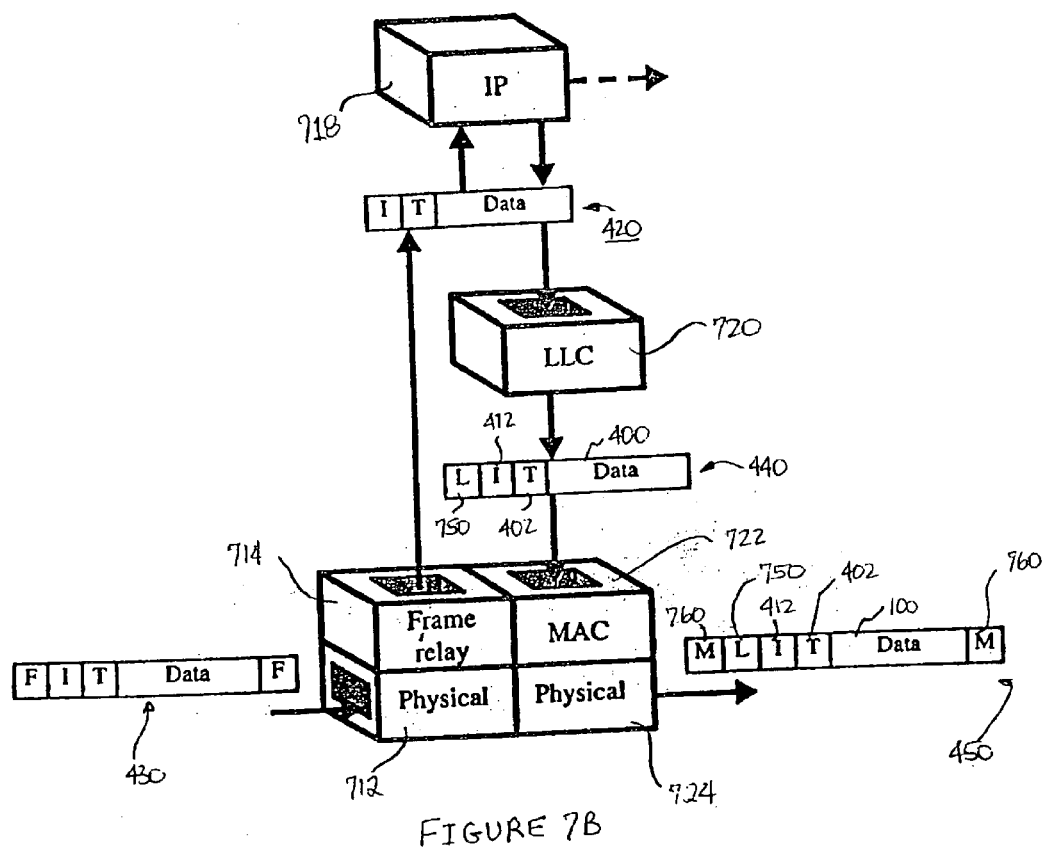
Figure 7C:
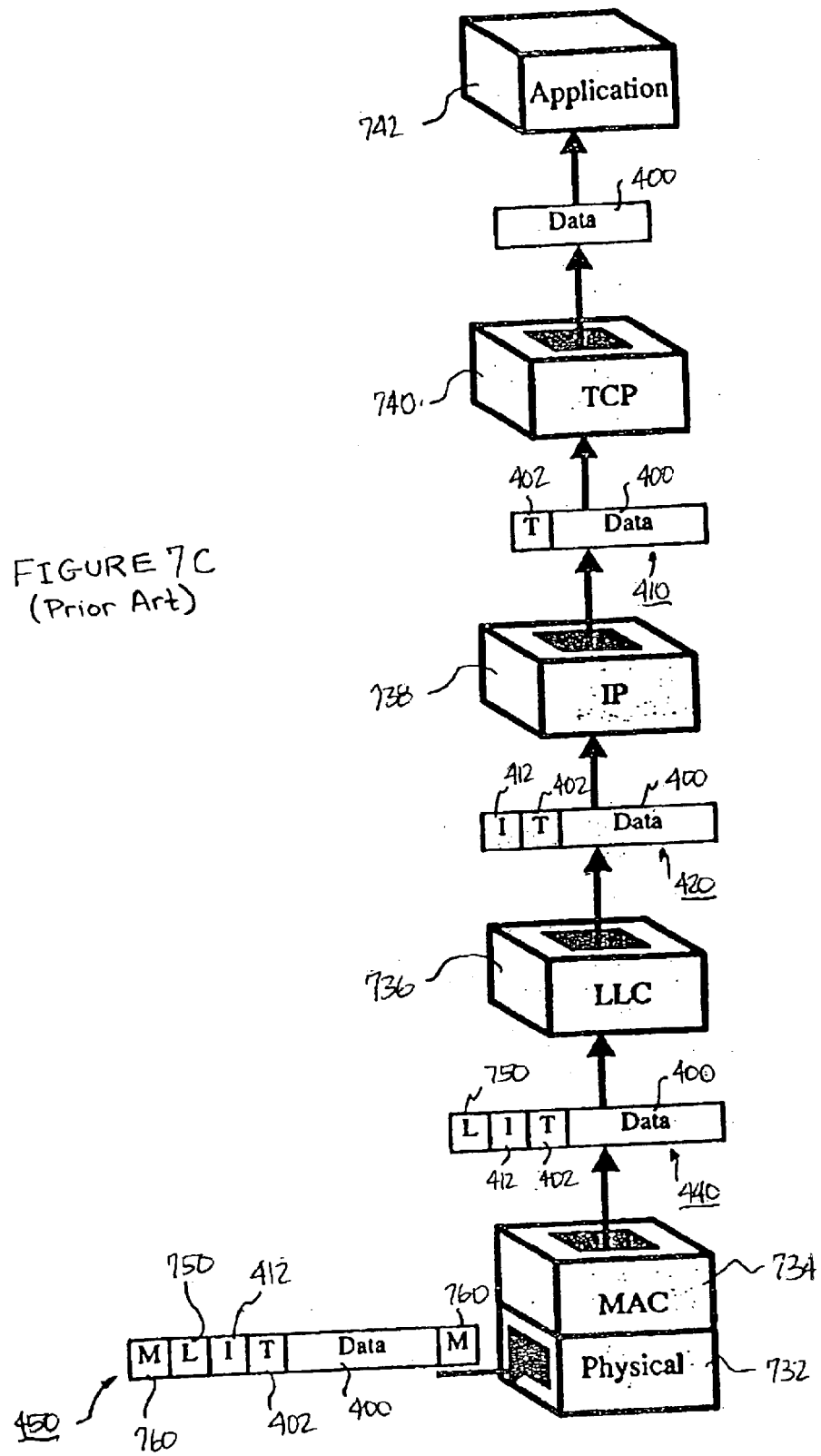

Recall from FIG. 6A that version 4 of the internet protocol header includes 32-bit source and destination addresses. FIG. 3 illustrates IP compliant addresses. Every host and router on the Internet has a unique IP address. Network numbers are assigned by the Network Information Center (or "NIC") to avoid conflicting addresses. This address includes a network number and a host number. Currently, there are four (4) classes of address formats. Class A permits up to 126 networks with up to 16 million hosts each. Class B permits up to 16,382 networks with up to 64,000 hosts each. Class C permits up to 2 million networks with up to 254 hosts each. Class D permits multicasting. Unlike IP address classes A, B and C, multicasting addresses are not assigned and cannot be reserved or controlled by the owner and/or operator of the LATA IP network. These addresses are controlled by routers which route multicast packets in accordance with the Internet group multicast protocol (or "IGMP"). Thus, the owner and/or operator of the LATA IP network cannot prevent outsiders from joining a multicast group by provisioning or controlling multicast addresses. To secure the multicast groups, the LATA IP network owner and/or operator may manage the multicast address space so that some are reserved for specific groups of customers. In this way, the aggregation unit 1010' can deny requests to join a multicast group.

More specifically, referring to step 2310, the method 1018' may examine the bits of the unique bit string (or context information) that are relevant to multicasting. (Recall, e.g., plan parts 1312 class of service 1320 of FIG. 13.) If it is determined that the bit(s) indicate a permission (for a customer) to join a particular multicast group, the aggregation unit will provide the packet to the port (corresponding to the customer) as shown in steps 2320 and 2330. Otherwise, if it is determined that the bit(s) do not indicate a permission for a customer to join the particular multicast group, the aggregation unit will block the packet from the port corresponding to the customer. Although not shown, the packet may be forwarded to a port which forwards packets related to network security to a monitoring and/or storage facility. The method 1018' is hen left via RETURN node 2340.

FIG. 31 is a table which illustrates how multicast networks and/or sub-networks can be associated with a virtual private network ("VPN"). More specifically, at least some bits of the VPN-OUI 3140 and VPN-Index 3150 (i.e., those bits not masked out by subnet mask 3130) can be associated with a multicast access control list group 3110 having associated multicast address 3120.

§ 4.3.5 Exemplary Access Router

Recall from FIG. 10 that the access router may perform an access control process 1082 based on an access control list 1083. A data structure of an exemplary access control list is described in § 4.3.5.1 below with reference to FIGS. 25 and 32. Then, an exemplary method that may be used to effect the access control process is described in § 4.3.5.2 with reference to FIGS. 26 and 32. Further recall from FIG. 10 that the access router may also perform a virtual private network addressing process 1084, a group quality of service process 1086 and a group monitor process 1088. An exemplary method that may be used to effect the virtual private network addressing process 1084 is described in § 4.3.5.3 below with reference to FIGS. 27 and 33. An exemplary method that may be used to effect the group service level process 1086 is described in § 4.3.5.4 below with reference to FIG. 28. Finally, an exemplary method that may be used to effect the group monitor process 1088 is described in § 4.3.5.5 below with reference to FIG. 24. Generally speaking, processor(s), application specific integrated circuit(s), programmable logic array(s), and/or other hardware and/or software may be used to effect the processes of the access router.

§ 4.3.5.1 Exemplary Access Control List Data Structure

Recall from the description of FIG. 13 in § 4.3.3 above that a common plan 1090' may be used such that various values of at least some bits of the context information correspond to various services or customer service agreements. (Recall parts 1312 and class of service 1320 of FIG. 13.) FIG. 25 illustrates a data structure of an exemplary access control list 1083' which may be used by the access router 812 to permit or deny access to services, locations, etc. More specifically, the list 1083' includes a column 2510 which lists various values of at least some bits of the context information (Recall, e.g., FIG. 13.) which correspond to various services or customer service agreements. As shown, these services may include various services offered by the owner and/or operator of the LATA IP network, such as virtual private networks with or without Internet access, Internet access only, etc. This information may correspond to the VPN-OUI 3225, VPN-Index 3230, protocol 3235, L4 port 3240, type of service 3245 and service level 3250 columns of FIG. 32. Ranges of the layer 3 (e.g., IP) source addresses are depicted in the column 2520 (See source IP address 3205 and mask 3210 columns of FIG. 32.), and ranges of the layer 3 (e.g., IP) destination addresses are depicted in the column 2530 (See destination IP address 3215 and mask 3220 columns of FIG. 32.). Based on the service bit(s) in column 2510, the layer 3 source address and/or the layer 3 destination address, the access router 812 can permit or deny a packet, as indicated by column 2540. The access router 812 may use these permit/deny instructions to decide whether to route or drop a packet. As can be appreciated, in this way, various values of bit(s) of the context information (as well as the layer 3 source and/or destination address) may be used to permit or deny access to various services. The last instruction in the access control list may be a deny command (if the packet was not already permitted). An exemplary method that may be carried out the access router is described in § 4.3.5.2 below.

§ 4.3.5.2 Exemplary Access Control Method

Figure 26:
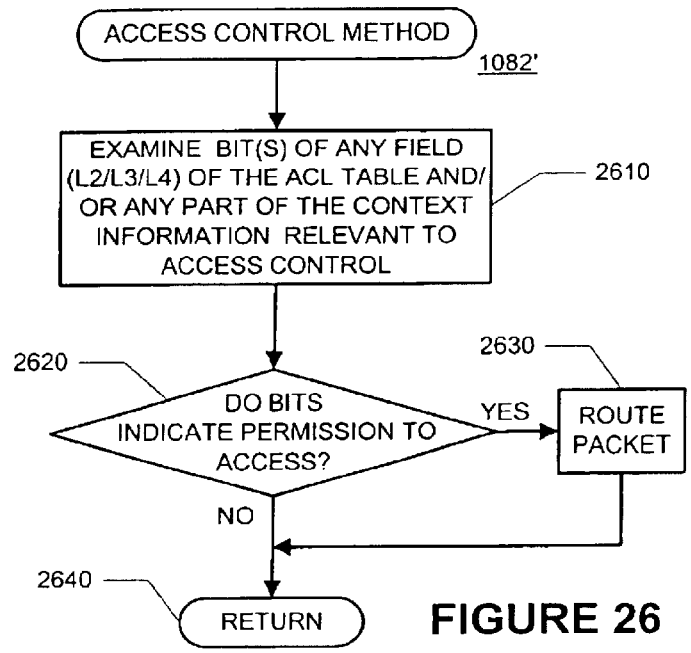
FIG. 26 is a flow diagram of an exemplary method that may be used to effect an access control function.

FIG. 26 is a flow diagram of an exemplary method 1082' which may be used to effect an access control process 1082. First, as shown in step 2610, any bit(s) of the context information and/or any bit(s) of layer 2, 3, and/or 4 addresses that are relevant to access control are examined. (These bits may be taken from the packet using filtering (e.g., masking), etc.) In decision branch point 2620, it is determined whether or not the bit(s) indicate a permission to access a network, a network location, or a service for example. (Recall permit/deny column 2540 of FIG. 25.) If the bit(s) do indicate permission to access, the packet is routed as shown in step 2630, and the method 1082' is left via RETURN node 2640. Otherwise, the packet is not routed, and the method 1082' is left via RETURN node 2640. Although not shown, any packets not routed may be forwarded to a port which forwards packets to a network security monitoring and/or storage facility.

§ 4.3.5.3 Exemplary Virtual Private Network Addressing Method

Figure 27A:
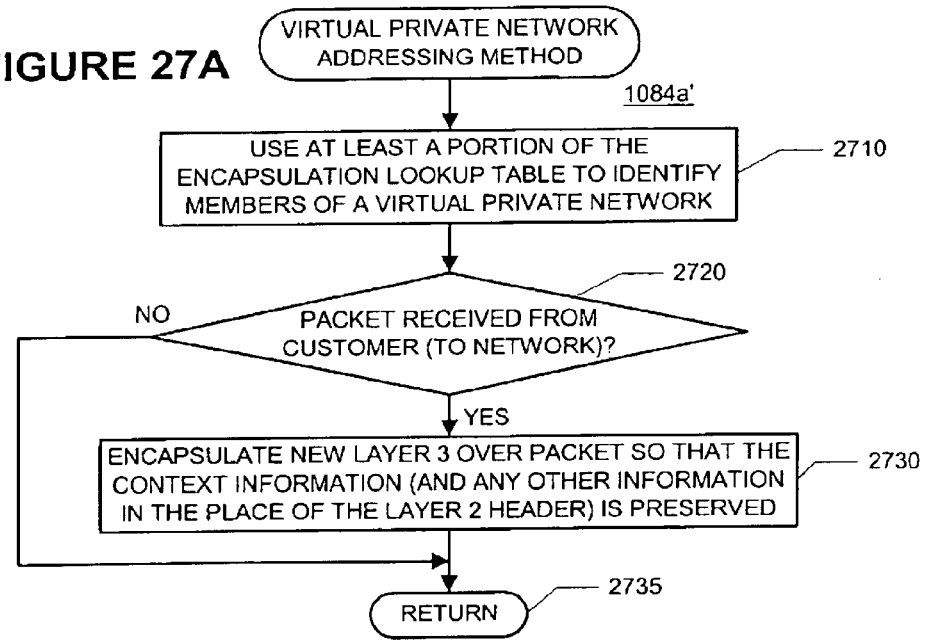
FIGS. 27A and 27B are flow diagrams of exemplary methods that may be used to effect a virtual private network addressing function as a packet enters the network (ingress) and as a packet leaves the network (egress), respectively.
Figure 27B:
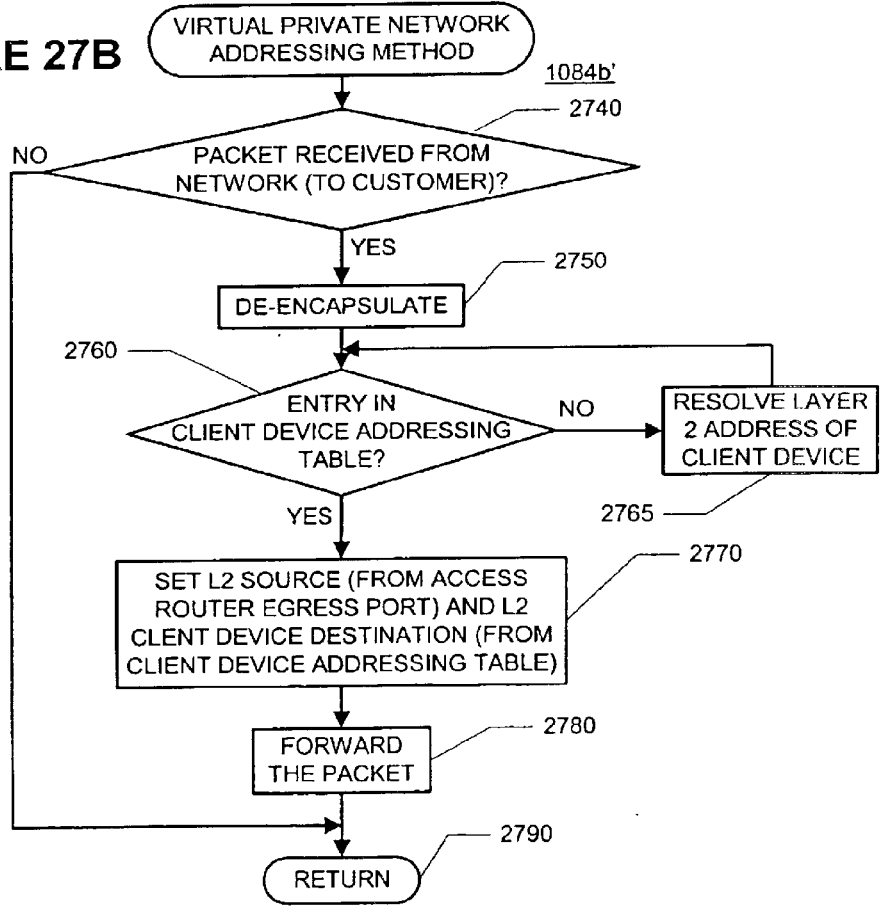

FIGS. 27A and 27B are flow diagrams of exemplary methods 1084a' and 1084b' which may be used to effect a part of the virtual private network addressing process 1084. However, the need for these methods will be introduced first.

Recall from FIG. 3 that different classes (e.g., A, B, or C) of IP addresses can have a different maximum number (e.g., 126, 16,382 or 2,000,000) of networks. Although not shown in FIG. 3, some of these addresses are not uniquely assigned, are not routed by most standard internet routers, and can be used by anyone. Thus, more than one company may be using the same private IP address.

The owner and/or operator of the IP LATA network may want to provide virtual private network services. However, as just described, private IP addresses are not necessarily globally unique. The access router 812 may solve this problem as follows. Referring to FIG. 27A, at step 2710, at least a portion of an inbound packet (e.g., at least a part of the context information) may be used to identify members of a virtual private network. (Recall FIGS. 29 and 31 and part 1312 of FIG. 13.) Thus, for example, a company could access the LATA IP network from more than one access router 812' via more than one aggregation unit 1010'. However, each of the ports of the aggregation unit 1010' with which the company was connected would include context information having one or more bits which could serve to uniquely identify that company's virtual private network. (Recall, plan part 1312 of FIG. 13.) This step need only be done once. (Recall step 2030 of the port configuration method illustrated in FIG. 20.) At decision branch node 2720, it is determined whether or not a packet is received from a customer (to be forwarded to the network). If so, a new layer 3 address encapsulates the packet so that its unique bit string (or context information), from which a layer 2 (e.g., MAC) address of the client device can be derived (Recall, e.g., the tables of FIGS. 29 and 30), is preserved as shown in step 2730. If this encapsulation were not done, the layer 2 address would change over each segment of the network. Thus, the encapsulation preserves the concept of group identification, service levels, etc. over the entire LATA IP network and not just at the edge of the network. FIG. 33 illustrates an exemplary encapsulation lookup table 1085'. Notice that a new layer 3 destination address 3350 can be derived from at least a part of the VPN-OUI 3330 and the VPN-Index 3340. This destination address is that of the access router (also referred to as an "egress access router" associated with the client device having the original layer 3 destination address).

FIG. 37 illustrates an encapsulated IP packet 3700 after routing has been determined. Notice that the layer 3 source address 3710 is that of the ingress access router (i.e., the router performing the encapsulation) and can be determined from column 3310 of the table 1085' FIG. 33. Notice also that the layer 3 destination address 3720 is that of the egress access router (i.e., the access router associated with the client device having the original layer 3 destination address 3730). The foregoing described the exemplary virtual private network addressing method 1084*a*' from the perspective of a packet entering the network. Below, a method 1084*b*' is described from the perspective of a packet leaving the network.

FIG. 27B is an exemplary method 1084*b*' that may be used to effect another part of the virtual private network addressing process. At decision branch node 2740, it is determined whether or not a packet is received from the network (to be forwarded to a customer). If so, the access router removes the encapsulation, as shown in step 2750. The original layer 3 destination address 3730 may be used with the client device address table 1089' (See column 3410 of FIG. 34.) to determine a new VPN-OUI (See column 3420.), VPN-Index (See column 3430.), and the layer 2 (e.g., MAC) address of the destination client device (See column 3440.) as shown in steps 2760 and 2770. If the client device address table 1089' does not include entries corresponding to the layer 3 destination address, an address resolution request (e.g., an "ARP") may be broadcast to request such information as shown in steps 2760 and 2765. The packet may then be forwarded to the aggregation device as shown in step 2780 before the method 1084*b*' is left via RETURN node 2790.

Note that although not shown, before the packet is forwarded towards the aggregation unit, the egress access router can perform access control and group quality of service processes based on at least some of the new bits (e.g., the new VPN-OUI and VPN-Index). In this way, if the destination customer (client) has a lower service level (e.g., service type or quality), then services which were not limited by the ingress access router (since the source customer (device) has a higher level of service) may be limited by the egress router.

Figure 28:
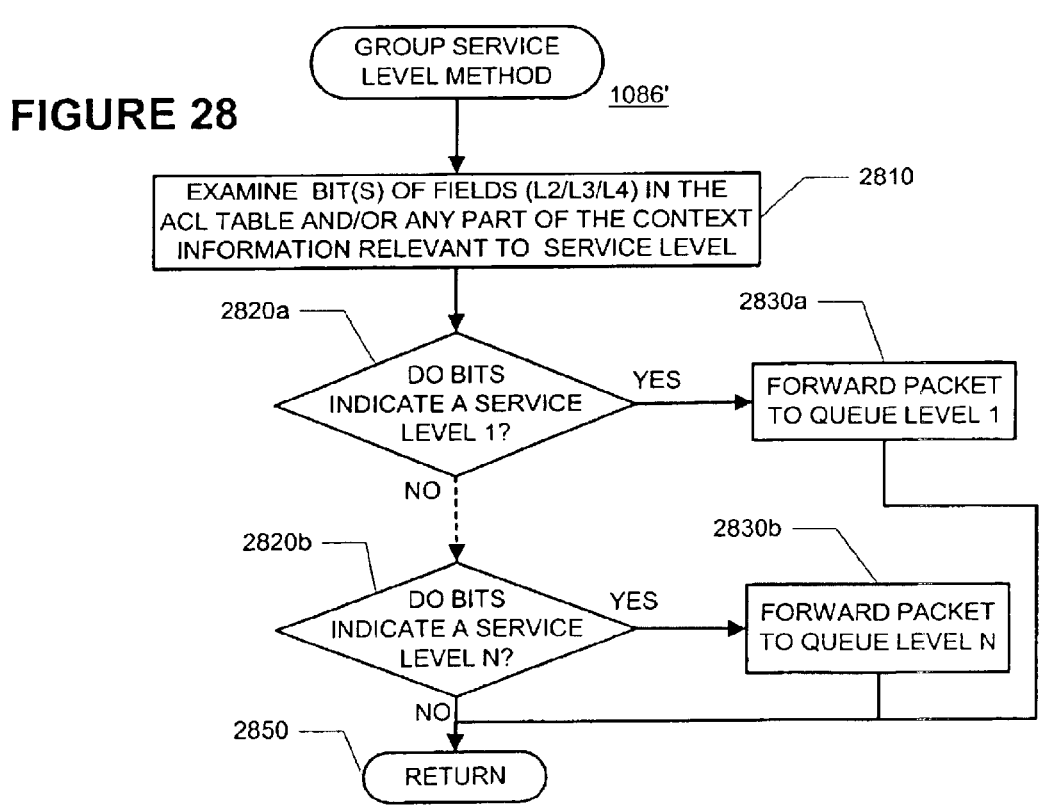
FIG. 28 is a flow diagram of an exemplary method that may be used to enable various service levels.

§ 4.3.5.4 Exemplary Method for Facilitating the Provision of Various Service Levels FIG. 28 is a flow diagram of an exemplary method 1086' which may be used to effect the group quality of service process 1086. First, as shown in step 2810, any bit(s) of the context information and/or any bit(s) of layer 2, 3, and/or 4 addresses that are relevant to service level (Recall, e.g., plan part 1320 of FIG. 13.) are examined. (Actually, the quality of service part of the context information may have already accounted for layer 3 and/or layer 4 information in the packet(s). If so, only those bits of the context information relevant to service level need be examined.) These bit(s) may be extracted from the context information using filtering (e.g., masking), etc. In decision branch point 2820, it is determined whether or not the bit(s) indicate a particular service level. (See, e.g., column 3250 of FIG. 32.) If the bit(s) indicated a particular service level, the packet may be forwarded to a queue level associated with the level of priority appropriate for that service level as shown in steps 2820 and 2830. The method 1086' is then left via RETURN node 2850.

§ 4.3.5.5 Exemplary Group Monitoring Process

Figure 24:
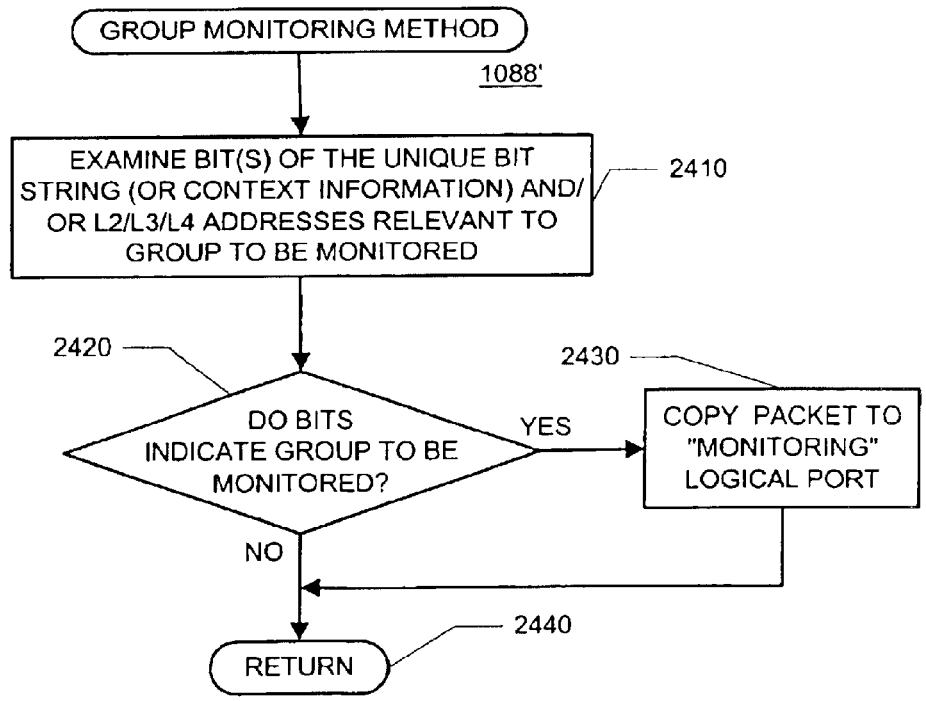
FIG. 24 is a flow diagram of an exemplary method that may be used to effect a customer group monitoring function.

The present invention may also allow packets to or from a particular group of customers (e.g., customers from the same company, customers purchasing particular quality of service guarantees, etc.) to be copied for monitoring. FIG. 24 is a high level flow diagram of an exemplary method 1088' which may be used to effect the group monitoring process 1088. As shown in step 2410, the method 1088' may examine the bit(s) of the unique bit string (or context information) and/or layer 2, 3, and/or 4 addresses to define the group of customers (Recall the access control list of FIG. 25 and part 1312 of FIG. 13.) to be monitored. If it is determined that the bit(s) indicate that the customer belongs to the group being monitored, the aggregation unit will provide a copy of the packet to a "monitoring" logical port (not shown) as shown in steps 2420 and 2430. Otherwise, if it is determined that the bit(s) do not indicate that the customer belongs to the group being monitored, the packet is simply processed as usual. The method 1088' is then left via RETURN node 2440. Notice that this method 1088' is transparent from the perspective of the client devices.

Having described exemplary embodiments of data structures which may be used by, and methods which may be performed by both the aggregation unit and the access router, an example which illustrates the end-to-end processing of a packet in a system employing these exemplary devices is set forth in § 4.4 below

§ 4.4 End-to End Processing of a Packet in a System Including Exemplary Aggregation Units and Access Routers An example which illustrates how a packet may be sent from a customer to the network (via an aggregation unit 1010' and an (ingress) access router 812') and how a packet is sent from the network to a customer (via an (egress) access router 812' and an aggregation unit 1010') is described below, with reference to FIGS. 19, 35, 36 and 37.

A packet may be provided from a customer, not shown, to an aggregation device 1010'. Referring to FIG. 35, the packet 3500 is received from the customer 1030' within a layer 2 header that includes a layer 2 (e.g., MAC) destination address 3522 and a layer 2 (e.g., MAC) source address 3524, and may include other fields 3525, 3526, 3527. The layer 3 header 3530 includes a protocol field 618', a port field 3532, a layer 3 source address field 622', a layer 3 destination address field 624', and a type of service field 606'.

Figure 19:
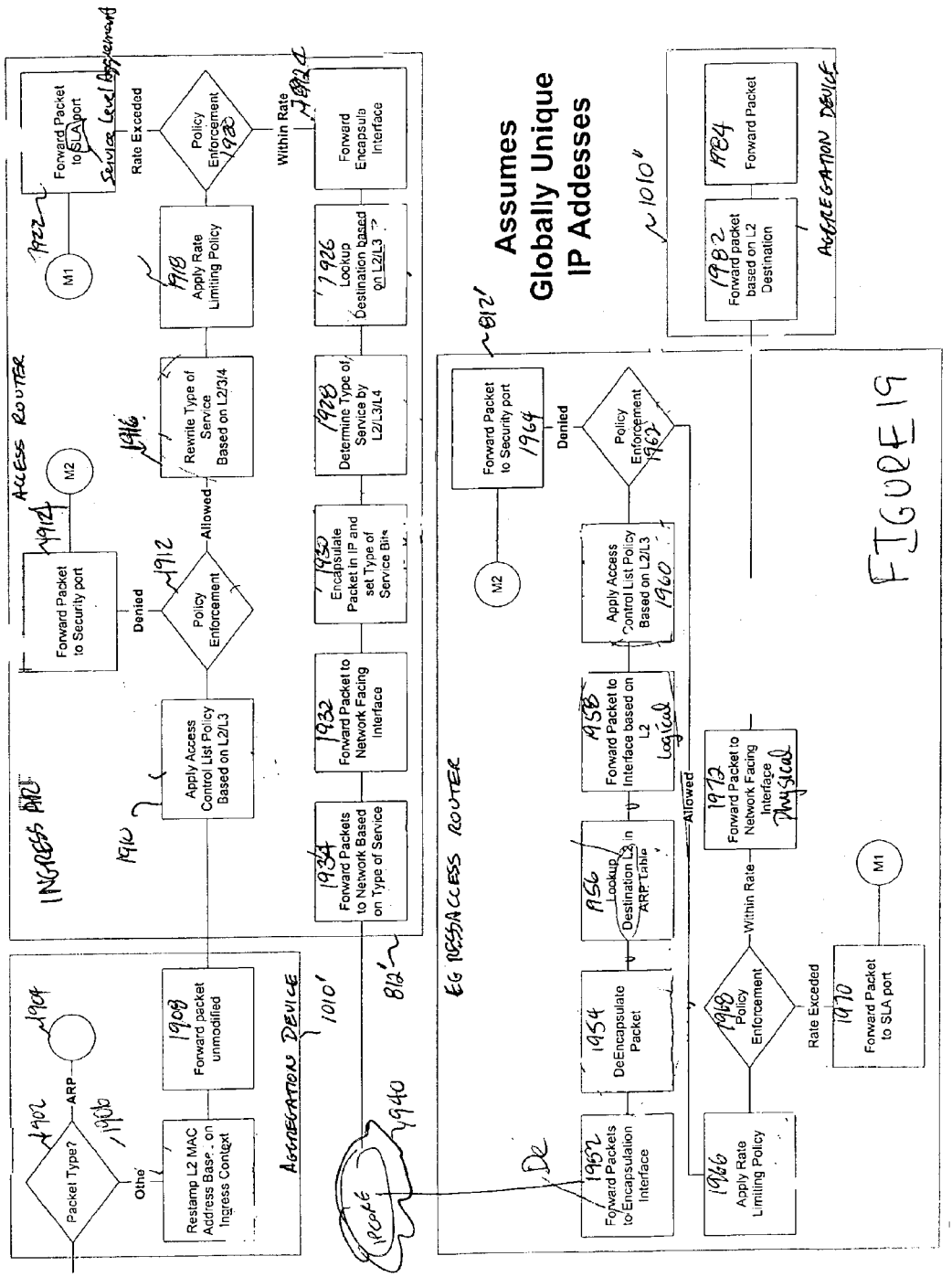
FIG. 19 is a high level flow diagram which illustrates operations which may be performed as a packet enters an IP network via an aggregation device and an (ingress) access router, and as a packet leaves an IP network via an (egress) access router and an aggregation device.

Referring to FIG. 19, if the packet is not an address resolution protocol (or ARP) packet, as shown by decision block 1902, the aggregation unit 1010' changes the layer 2 address information 3522 and 3524 of the layer 2 header 3520 (and potentially other information of the layer 2 header 3520, such as field 3526 for example) to the ingress context information (e.g., the unique bit string) associated with the logical port or interface (and derived from the received packet(s)) as shown in block 1906. (Recall FIG. 29 and step 2120 of FIG. 21 and FIG. 13.) FIG. 36 illustrates the transformation of a packet effected by step 906. This new packet 3600 is then passed onto the (ingress) access router 812' as shown in block 1908.

Still referring to FIG. 19, at the access router 812', an access control list (Recall, e.g., FIGS. 25 and FIG. 32.) policy may be applied as shown in block 1910, and the packet may be allowed or denied based on the access control list policy as shown by decision block 1912. Recall from FIG. 25 that the access control list may use at least a portion of the unique bit string (or context information) replacing the layer 2 header information (See, e.g., column 2510 of FIG. 25 and columns 3225 and 3230 of FIG. 32.) and/or at least a portion of the layer 3 address information (See, e.g., columns 2520 and 2530 of FIG. 25 and columns 3205, 3210, 3215 and 3220 of FIG. 32.). If the packet is denied access, it may be forwarded to a security port "M2" as indicated by block 1914. If, on the other hand, the packet is allowed, a type of service may be rewritten as a "service level" based on layer 2, 3, and/or 4 information as shown in block 1916. (See, e.g., column 3245 of FIG. 32 and field 3760 of FIG. 37.)

Next, as shown in block 1918 and decision block 1920, a rate limiting policy may be applied and enforced. (See, e.g., column 3250 of FIG. 32.) If the customer (client) device is exceeding the rate specified in its class of service level agreement, the packet(s) may be forwarded to a service level agreement port "M1" as shown by block 1922. If, on the other hand, the customer (client) device is within the rate specified in its class of service level agreement, the packet may then be forwarded to an encapsulation interface as shown by block 1924.

Next, as shown by blocks 1926 and 1928, the layer 2 and 3 addresses, as well as the service level are read. (See, e.g., FIG. 32.) Then, as shown by block 1930, the packet is encapsulated with layer 3 information and service level bits are set. This encapsulation is shown in FIG. 37, wherein the layer 3 (e.g., IP) source address 3710 is derived from column 3310 of FIG. 33, the layer 3 (e.g., IP) destination address 3720 is derived from column 3350 of FIG. 33, and the service level value 3760 is derived from the class of service and quality of service values. (See, e.g., column 3245 of FIG. 32 and part 1320 of FIG. 13.) The layer 2 source address 3740 and the layer 2 destination address 3750 may also be written as shown in FIG. 37. The layer 2 source address 3712 is known and the layer 2 destination address 2714 may be generated from a lookup table in the (ingress) access router 812'. The packet may then be forwarded to the network-facing interface of the access router as shown by block 1932.

The packet(s) may then be forwarded to the network based on its service level. (Recall FIG. 28 and part 1320 of FIG. 13.) For example, there may different queues that have different associated priorities. Packets may be provided to a particular queue based on their service level. The packets then go to the core IP network 1940 based on some queuing or scheduling discipline.

Having described the way in which an aggregation unit 1010' and an (ingress) access router 812' may handle packets from a customer destined for the core IP network 1940, the way in which an (egress) access router 812' and an aggregation unit 1010' may handle packets from the core IP network 1940 destined for a customer is now described.

As shown by block 1952, a packet(s) received from the core IP network 1940 is forwarded to a de-encapsulation interface where, as shown by block 1954, it is de-encapsulated. (Recall, e.g., step 2750 of FIG. 27B.) More specifically, referring back to FIG. 37, the layer 2 transport and IP encapsulation may be stripped from the received packet.

Then (assuming that layer 3 (e.g., IP) addresses are globally unique), the layer 2 destination address (e.g., client MAC address) is derived as shown in block 1956. For example, referring to the client device addressing table of FIG. 34, given a layer 3 (e.g., IP) destination address 3410, the unique bit string (or context information) (e.g., the VPN-ID 3420 and 3430) and the layer 2 destination address 3440 can be derived. (If, on the other hand, it is not assumed that the IP addresses are globally unique, a routing policy based on the layer 2 and 3 addresses may be applied.) The packet is then forwarded to a logical interface of the (egress) access router, as shown in block 1958, where access control and rate limiting policies may be applied based on the new unique bit string (or context information) (associated with the destination client device rather than the source client device) as shown in steps 1960, 1962, 1964, 1966, 1968, and 1970. More specifically, at the (egress) access router 812', an access control list (Recall, e.g., FIG. 25.) policy may be applied as shown in block 1960, and the packet may be allowed or denied based on the access control list policy as shown by decision block 1962. Recall from FIG. 25 that the access control list may use a portion of the unique bit string (or context information) replacing the layer 2 address information (See, e.g., column 2510 of FIG. 25 and columns 3225 and 3230 of FIG. 32.) and/or a portion of the layer 3 address information (See, e.g., columns 2520 and 2530 of FIG. 25 and columns 3205, 3210, 3215 and 3220 of FIG. 32.) If the packet is denied access, it may be forwarded to a security port "M2" as indicated by block 1964. If, on the other hand, the packet is allowed, as shown in block 1966 and decision block 1968, a rate limiting policy may be applied and enforced. (See, e.g., column 3250 of FIG. 32.) If the customer (client) device is exceeding the rate specified in its service level agreement, the packet(s) may be forwarded to a service level agreement port "M1" as shown by block 1970. If, on the other hand, the customer (client) device is within the rate specified in its service level agreement, the packet may then be forwarded to a network facing interface of the aggregation device 1010' as shown by block 1972.

As shown in blocks 1982 and 1984, the aggregation device 1010' may forward the packet based on the layer 2 (e.g., MAC) destination address. Recall that this address may have been derived from the client device addressing table of FIG. 34. This address may be used to determine a logical port or interface of the aggregation unit 1010'. (Recall, e.g., the address table of FIG. 30.

Thus, the operations of an aggregation unit 1010' and an access router 812' on network bound and customer bound packets have been described.

§ 4.5 Conclusions

In view of the foregoing, it is clear that the aggregation unit of the present invention may advantageously permit access to an IP network with a robust and economical access technology such as Ethernet. Packets from a large number of physical line connections can be aggregated onto a smaller number of high bandwidth links to an access router. Multicast groups are supported. The service provided to groups of customers may be easily copied for monitoring. The layer 2 (e.g., MAC) addressing scheme used by the present invention may permit the access router to control access to various services and locations, to facilitate virtual private networks, and to support different quality of service levels.

What is claimed is:

1. A method for provisioning services to packets sourced from a number of client devices, the method comprising:

a) accepting a packet sourced from one of the number of client devices, wherein the packet has had at least a part of a layer 2 header replaced with a unique bit string, wherein the layer 2 header is an Ethernet header, wherein when the unique bit string replaces the at least a part of the layer 2 header a modified header is generated, wherein a bit-size of the modified header is the same as that of the Ethernet header, and wherein the unique bit string is independent of any contents of the packet;

b) determining whether or not the packet is entitled to access a particular service using at least a portion of the unique bit string; and c) if it is determined that the packet is entitled to access the particular service, then routing the packet.

2. The method of claim 1 wherein at least a portion of the unique bit string represents one of a number of logical interfaces.

3. The method of claim 1 wherein at least a portion of the unique bit string corresponds to a virtual private network-organizational universal identifier.

4. The method of claim 1 wherein at least a portion of the unique bit string corresponds to a virtual private network-INDEX.

5. The method of claim 1 wherein at least a portion of the unique bit string represents a logical port identifier including a geographic location identifier and a physical unit identifier.

6. The method of claim 1 wherein the step of determining whether or not the packet is entitled to access a particular service using at least a portion of the unique bit string is a separate determination from determining whether or not the packet can be forwarded.

7. The method of claim 1 wherein the packet is routed only if it is determined that the packet is entitled to access the particular service.

8. A method for providing various quality of service levels to packets sourced from a number of client devices, the method comprising:
   a) accepting a packet sourced from one of the number of client devices, wherein the packet has had at least a part of a layer 2 header replaced with a unique bit string that is independent of any contents of the packet;
   b) determining a service level to which the packet is entitled using at least a portion of the unique bit string, wherein the layer 2 header is an Ethernet header, wherein when the unique bit string replaces the at least a part of the layer 2 header a modified header is generated, and wherein a bit-size of the modified header is the same as that of the Ethernet header; and
   c) forwarding the packet to a particular one of a plurality of queues associated with the service level determined.

9. The method of claim 8 wherein at least a portion of the unique bit string represents one of a number of logical interfaces.

10. The method of claim 8 wherein at least a portion of the unique bit string corresponds to a virtual private network-organizational universal identifier.

11. The method of claim 8 wherein at least a portion of the unique bit string corresponds to a virtual private network-INDEX.

12. The method of claim 8 wherein at least a portion of the unique bit string represents a logical port identifier including a geographic location identifier and a physical unit identifier.

13. The method of claim 8 wherein the service level is a quality of service level.

14. The method of claim 8 wherein the service level is a quality of service level represented by a plurality of bits.

15. A method for monitoring packets sourced from a group of client devices defining a subset of client devices, each of the packets having at least a part of a layer 2 header replaced with a unique bit string, the method comprising:
    a) determining whether or not the packet belongs to the group of client devices using at least a portion of at least one of the unique bit string, wherein the layer 2 header is an Ethernet header, wherein when the unique bit string replaces the at least a part of the layer 2 header a modified header is generated, and wherein a bit-size of the modified header is the same as that of the Ethernet header; and
    b) if it is determined that the packet does belong to the group of client devices, then
       i) copying the packet to generate a duplicate packet, and
       ii) forwarding the duplicate packet to a monitoring facility, wherein the monitoring facility monitors at least one of (A) service provided to a group of customers and (B) security.

16. The method of claim 15 wherein at least a portion of the unique bit string represents one of a number of logical interfaces.

17. The method of claim 15 wherein at least a portion of the unique bit string corresponds to a virtual private network-organizational universal identifier.

18. The method of claim 15 wherein at least a portion of the unique bit string corresponds to a virtual private network-INDEX.

19. The method of claim 15 wherein the unique bit string is independent of a layer 2 destination address.

20. The method of claim 15 wherein at least a portion of the unique bit string represents a logical port identifier including a geographic location identifier and a physical unit identifier.

21. An apparatus for provisioning services to packets sourced from a number of client devices, each of the packets having at least a part of a layer 2 header replaced with a unique bit string, the apparatus comprising:
    a) an access control list; and
    b) an access controller, the access controller including
       i) means for determining whether or not the packet is entitled to access a particular service using
          A) contents of the access control list, and
          B) at least a portion of the unique bit string, wherein the layer 2 header is an Ethernet header, wherein when the unique bit string replaces the at least a part of the layer 2 header a modified header is generated, and wherein a bit-size of the modified header is the same as that of the Ethernet header, and
       ii) means for routing the packet if it is determined that the packet is entitled to access the particular service.

22. The method of claim 21 wherein the unique bit string is independent of a layer 2 destination address.

23. The method of claim 21 wherein at least a portion of the unique bit string represents a logical port identifier including a geographic location identifier and a physical unit identifier.

24. An apparatus for providing various service levels to packets sourced from a number of client devices, each of the packets having at least a part of a layer 2 header replaced with a unique bit string that is independent of contents of the packets, the apparatus comprising:
    a) a plurality of queues, each of the plurality of queues associated with a particular service level;
    b) a service level list; and
    c) a service level controller, the service level controller including
       i) means for determining a service level to which the packet is entitled using
          A) contents of the service level list, and
          B) at least a portion of the unique bit string, wherein the layer 2 header is an Ethernet header, wherein when the unique bit string replaces the at least a part of the layer 2 header a modified header is generated, and wherein a bit-size of the modified header is the same as that of the Ethernet header, and
       ii) means for forwarding the packet to the one of the plurality of queues associated with the quality of service level determined.

25. The method of claim 24 wherein at least a portion of the unique bit string represents a logical port identifier including a geographic location identifier and a physical unit identifier.

26. An apparatus for monitoring packets sourced from a group of client devices defining a subset of client devices, each of the packets having at least a part of a layer 2 header replaced with a unique bit string, the apparatus comprising:
   a) a monitoring port for accepting packets of the group of client devices to be monitored;
   b) means determining whether or not an accepted packet belongs to the group of client devices using at least a portion of the unique bit string, wherein the layer 2 header is an Ethernet header, wherein when the unique bit string replaces the at least a part of the layer 2 header a modified header is generated, and wherein a bit-size of the modified header is the same as that of the Ethernet header; and
   c) means for
      i) copying the accepted packet to generate a duplicate packet, and
      ii) forwarding the duplicate packet to the monitoring port so that at least one of (A) service to a group of customers and (B) security, may be monitored, if it is determined that the packet was sourced by a client device belonging to the group of client devices.

27. The method of claim 26 wherein the unique bit string is independent of a layer 2 destination address.

28. The method of claim 26 wherein at least a portion of the unique bit string represents a logical port identifier including a geographic location identifier and a physical unit identifier.

29. A method for provisioning services to packets sourced from a number of client devices, the method comprising:
   a) accepting a packet sourced from one of the number of client devices;
   b) replacing at least a part of a layer 2 header of the packet with a unique bit string that is independent of any contents of the packet;
   c) determining whether or not the packet is entitled to access a particular service using at least a portion of the unique bit string; and
   d) if it is determined that the packet is entitled to access the particular service, then routing the packet,
      wherein the layer 2 header is an Ethernet header, wherein when the unique bit string replaces the at least a part of the layer 2 header a modified header is generated, and wherein a bit-size of the modified header is the same as that of the Ethernet header.

30. A method for providing various quality of service levels to packets sourced from a number of client devices, the method comprising:
   a) accepting a packet sourced from one of the number of client devices;
   b) replacing at least a part of a layer 2 header of the packet with a unique bit string that is independent of any contents of the packet;
   c) determining a service level to which the packet is entitled using at least a portion of the unique bit string; and
   d) forwarding the packet to a queue associated with the service level determined,
      wherein the layer 2 header is an Ethernet header, wherein when the unique bit string replaces the at least a part of the layer 2 header a modified header is generated, and wherein a bit-size of the modified header is the same as that of the Ethernet header.

* * * * *